Figure 1:
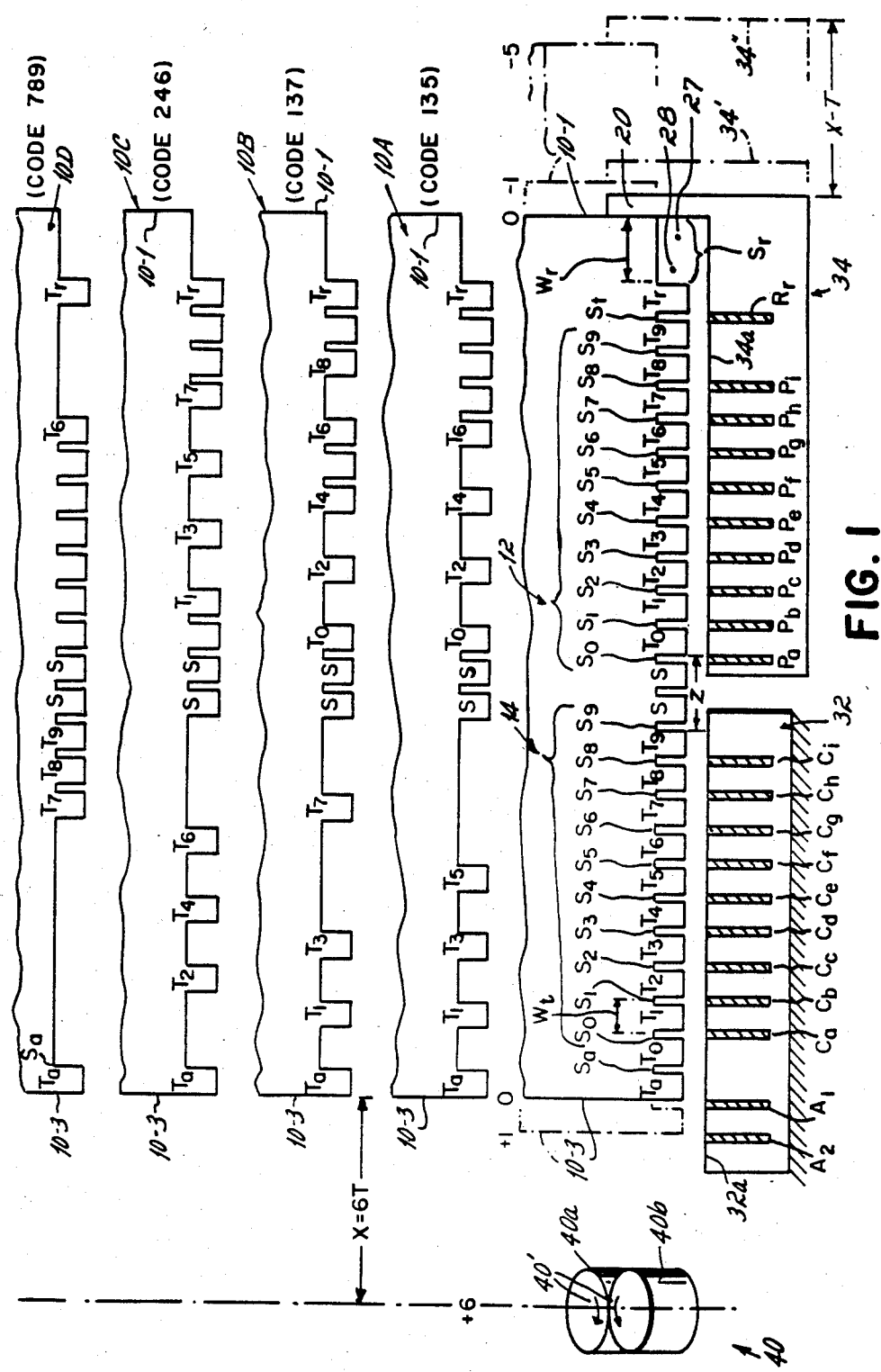

United States Patent [19]

Neumeier

[11] Patent Number: 4,601,397

[45] Date of Patent: Jul. 22, 1986

[54] MACHINE-RETRIEVABLE CARD AND CARD RETRIEVAL APPARATUS AND METHOD THEREFOR

[75] Inventor: Paul J. Neumeier, Loveland, Ohio

[73] Assignee: Access Corporation, Cincinnati, Ohio

[21] Appl. No.: 653,131

[22] Filed: Sep. 21, 1984

[51] Int. Cl.⁴ .............................................. B07C 5/36
[52] U.S. Cl. .................................... 209/608; 209/610
[58] Field of Search ....................... 209/547, 608–613; 235/487, 489, 494, 495

[56] References Cited

U.S. PATENT DOCUMENTS

| | | | |
|---|---|---|---|
| 3,220,417 | 11/1965 | Gallagher | 209/608 |
| 3,266,497 | 8/1966 | Bleiman | 209/608 |
| 3,478,877 | 11/1969 | Parry | 209/609 |
| 3,738,486 | 6/1973 | Takahama et al. | 209/608 |
| 4,190,164 | 2/1980 | Matsuda | 209/610 |
| 4,330,063 | 5/1982 | Neumeier | 209/608 |

Primary Examiner—Robert B. Reeves
Assistant Examiner—Edward M. Wacyra
Attorney, Agent, or Firm—Wood, Herron & Evans

[57] ABSTRACT

A machine-retrievable card and associated card retrieval apparatus and method therefor is disclosed in which the card is provided with a code-notched sorting edge located between the leading and trailing card edges which has (a) a predetermined configuration of complementary and primary digit code teeth which are retained and removed, respectively, to encode the card with a particular digit, and (b) an acquisition tooth at the leading edge and associated acquisition slot, and (c) a return tooth displaced inwardly of the trailing edge by an associated notch. The card retrieval apparatus includes complementary and primary code blades which selectively engage associated complementary and primary code slots of the card, respectively, as well as an acquisition blade and a return blade which cooperate with the acquisition and return teeth, respectively. The blades engage the card sorting edges and shift in a specified sequence to shift the cards in stages between three principal positions to thereby select a desired card from the deck.

15 Claims, 19 Drawing Figures

FIG. II

MACHINE-RETRIEVABLE CARD AND CARD RETRIEVAL APPARATUS AND METHOD THEREFOR

This invention relates to card retrieval, and more particularly to retrieval of edge-notched cards.

A variety of edge-notched card retrieval schemes have been proposed in the past. None have been entirely satisfactory for one or more reasons. For example, in some of the proposals magnetic forces are utilized to physically act upon the desired card and separate it from the undesired cards. This requires that magnetically attractable elements be affixed to each card to facilitate the application of magnetic force to the card by an electromagnet or the like to provide the necessary card separating force. This requirement unnecessarily adds to the cost of the cards and, in certain instances, increases the overall thickness of the card such that fewer cards can be stored in a card selector of given dimensions.

Another disadvantage of prior card selection proposals inheres in the fact that the selecting force applied to the desired card is not sufficiently positive to preclude a "nonsort", i.e., a failure to select a desired card, if the desired card is subjected to substantial frictional retention forces applied by adjacent cards. In other instances "missorts" result, that is, selection of an undesired card, by reason of the failure to apply sufficiently positive retention forces to undesired cards which may be acted upon by frictional forces of adjacent desired cards which are moving.

In other systems, which overcome the foregoing problems, such as that disclosed in U.S. Pat. No. 4,330,063, two platens having sorting blades are used which during digit selection have relative movement which is toward each other. In such systems, the relative motion between desired and undesired cards during digit selection steps is such that the frictional force applied by undesired cards to desired cards, and vice versa, has a tendency to rotate the desired and undesired cards away from the sorting blades associated with the card sorting edges, which rotation if it occurs can prevent proper card-sorting coaction between the card sorting edges and sort blades, which in turn introduces the opportunity for card sorting errors to occur.

Accordingly, it has been an objective of this invention to provide a card selection system of the nonmagnetic force type, including a card and associated card-selecting apparatus and method, which minimizes nonsorts and missorts occasioned by substantial frictional retention forces applied to desired cards which must move during the selection process or insufficient positive retention forces applied to undesired cards which should remain stationary during card selection, respectively, and which further minimizes sorting errors occasioned by rotation-inducing frictional forces imposed on desired and undesired cards due to relative movement thereof toward each other during digit selection steps. This objective has been accomplished in accordance with the principles of this invention by providing, in part, a card having leading and trailing edges between which is located a sorting edge, which sorting edge includes:

(a) an acquisition tooth of specified width W bounded by the leading edge of the card and an acquisition slot, (b) a return tooth of width W bounded on its inner edge by a slot and on its outer edge by a notch of width of at least 2 W interposed between the return tooth and the trailing edge of the card, (c) a complementary code region of N equally spaced removable complementary code teeth each of width W, and N equally spaced complementary slots, each located rearwardly of its respectively associated complementary code tooth, and (d) a primary code region of N equally spaced removable primary code teeth each of width W, and N equally spaced primary slots, each located forwardly of its respectively associated primary code tooth, with the rearmost complementary slot and the forwardmost primary slot being spaced apart a distance at least equal to 2W.

The cards are encodeable in an "M digit out of N digit" code format by removing primary code teeth, and leaving complementary code teeth, only at the primary and complementary code tooth locations corresponding to the M digits of the particular card code.

To effect selection of a desired coded card from a deck of similarly encoded cards, the desired and undesired cards are first located in a "0" position with their respective acquisition and return teeth aligned. Cards not having the first code digit are then positively displaced to a first rearward, or "−1", position, a distance W from the 0 position, with a rearwardly moving primary blade engaged in the primary slot of the first code digit of the undesired card, while the desired cards encoded with the first code digit are positively held at the 0 position with a stationary complementary blade engaged in the complement slot of the first code digit. The entire deck is then shifted one tooth width in a direction opposite to the initial movement of the undesired cards, to place the cards with the first code digit in a "+1" position and the cards without the first code digit in the 0 position.

Thereafter, cards in the +1 position having both the first and second code digits are positively retained in the +1 position by a stationary complementary sort blade associated with the second code digit of the desired cards, while cards in the +1 position not having both the first and second code digits are advanced rearwardly by the rearwardly moving primary code blade corresponding to the second code digit a distance of one tooth width W to the 0 position. As an incident to the foregoing movement of the primary code blade, some of the cards which were in the 0 position advance to the −1 position, with the result that only cards with both the first and second code digits remain in the +1 position, while cards which do not have both the first and second code digits are collectively in another group consisting of two subgroups of cards at the 0 and −1 positions, respectively.

In preparation for the third digit selection step, the two subgroups of cards in the 0 and −1 positions, which do not each have both the first and second code digits, are recombined into a single group at the 0 position. Thereafter, the third digit selection step is accomplished by positively retaining at the 0 position with the stationary complementary blade associated with the third code digit all cards in the 0 position having all of the first, second and third code digits, while positively advancing rearwardly with the rearwardly moving primary code blade associated with the third code digit from the +1 to the 0 position cards in the +1 position not having all three code digits. As an incident to removing cards not having all three of the code digits from the +1 position, certain of the cards in the 0 position are advanced to the −1 position, leaving undesired cards in a single group collectively consisting of one subgroup in the 0 position and one subgroup in the −1 position.

The foregoing recombination and digit selection steps are repeated until all M code digits have been selected whereupon cards with all M digits are in the +1 position and all cards not containing all M code digits are in the 0 position.

Thereafter, and to effect further separation of the desired and undesired cards, the acquisition tooth of the desired cards in the +1 position are captured with an acquisition blade and the undesired cards in the 0 position are captured with a return blade, and with the cards so captured, the acquisition and return blades are separated further an arbitrary distance, as desired. If the return blade is moved rearwardly, e.g., the width of five teeth (5W), and the acquisition tooth is held stationary, the desired and undesired cards are separated a distance equal to six teeth (6W). If it is now desired to position the desired cards, which are still in the +1 position, at some forward position, e.g., to facilitate convenient removal of the desired cards from the deck, the entire deck is shifted forwardly. This can be accomplished by engaging all the undesired cards with primary sort bars located rearwardly of the return tooth of the desired cards, and then shifting forwardly the primary bars, to in turn simultaneously shift the entire deck forwardly.

In accordance with the present invention, since the undesired cards are being sequentially withdrawn from the deck of cards containing the desired cards during digit selection steps by the moving primary code blades away from the complementary code blades, while the desired cards are restrained against movement by the stationary complementary code blades, the frictional force on the desired cards applied by the undesired cards, and vice versa, is such that the desired cards and the undesired cards are urged downwardly toward the code sort blades, rather than upwardly away from them. As a consequence, sorting errors are reduced.

These and other features, advantages, and objectives of the invention will become more readily apparent from a detailed description thereof taken in conjunction with the drawings in which:

FIG. 1 is a side elevational view of the card selector of this invention showing the relationship of (a) the cards, (b) the associated primary and complementary selection blades, return blade, and acquisition blade, all of which are selectively elevatable relative to the stationary complementary platen and movable primary platen on which the cards are vertically supported along their bottom coded edge, and (c) the selected card removal device; and FIGS. 2-19 are schematic side elevational views of the card selection apparatus of this invention showing the relationship of the cards, blades, and platens, and a selected card removal device during successive stages of an illustrative card selection process.

The card 10 of this invention includes along one edge, termed herein the "sorting edge", which is preferably the bottom edge, a primary code region 12 and a complementary code region 14. Assuming the cards are encoded in accordance with an "M out of N" format, e.g., a "3 out of 10" code, each of the primary and complementary code regions 12 and 14 include ten teeth $T_0, T_1 \ldots T_9$ of identical, although arbitrary, width $W_t$ measured in a horizontal direction. Located rightwardly of each primary code tooth $T_0, T_1, \ldots T_9$ of the primary code region 12 are slots $S_0, S_1, \ldots S_9$ which have a width measured in the horizontal direction adapted to receive underlying vertically shiftable primary blades $P_a, P_b, \ldots P_i$ to be described in detail hereafter. The height of each slot S of the primary code region 12 measured in a vertical direction is in no sense critical, although the height should provide sufficient engagement with an underlying primary blade $P_a, P_b, \ldots P_i$ to enable horizontal movement to be imparted to a undesired card, that is, a card which is not to be selected, in a rightwardly direction when engaged with a rightwardly moving elevated primary selector blade P located in a slot S to the immediate left of a primary code tooth T which has not been removed. For example, the slot $S_1$ of the primary code region 12 should have a vertical height which sufficiently engages an underlying elevated primary blade $P_a$ to permit an undesired card to be shifted to the right, assuming the tooth $T_1$ has not been removed, when the blade $P_a$ is shifted to the right in the course of a card selection process.

Located to the right of each of the teeth $T_0, T_1, \ldots T_9$ of the complementary code region 14 are slots $S_0, S_1, \ldots S_9$. Like the slots S of primary code region 12, the slots S of the complementary code region 14 have a width measured in a horizontal direction sufficient to permit reception of an underlying selectively elevatable complementary blade $C_a, C_b, \ldots C_i$, of a set of complementary select blades to be described hereafter in detail. The height of each slot S of the complementary code region 14 measured in a vertical direction is not critical, although the height should provide sufficient engagement with an underlying complementary blade $C_a, C_b, \ldots C_i$ to prevent rightward movement of a desired card when the respectively associated card complementary code tooth T located immediately to the left of the complementary slot S has not been removed. For example, the vertical height of the slot $S_1$ of complementary code region 14 should be sufficient to prevent, when complementary blade $C_b$ is elevated and engaged therewith, rightward movement of a desired card when the complementary tooth $T_1$ has not been removed.

The card 10 also includes along its sorting edge an acquisition tooth $T_a$ and an associated acquisition slot $S_a$ located immediately to the right thereof. The width $W_a$ of the acquisition tooth A measured in the horizontal direction is equal to the width $W_t$ of the teeth T of the complementary code and primary code regions 14 and 12, respectively. The width measured in a horizontal direction of the acquisition slot $S_a$, like the width of the slots S of the primary and complementary code regions 12 and 14, is sufficient to accommodate reception of selectively elevatable acquisition blades $A_1$ and $A_2$ to be described in more detail hereafter. Acquisition blades $A_1$ and $A_2$ are always elevated together during a card selection operation, as will become apparent hereafter.

The card 10 also includes along its lower sorting edge a return tooth $T_r$ having a width measured in the horizontal direction equal to the width $W_t$ of the teeth T of the primary and complementary code regions 12 and 14 and the width $W_a$ of the acquisition tooth A. A slot $S_t$ immediately to the left of the return tooth $T_r$ receives a return blade $R_r$, to be described, to facilitate leftward shifting of cards containing the digit $D_1$ following the first digit selection step, from the 0 position to the +1 position, for reasons to become apparent hereafter. The portion of the sorting edge immediately to the right of the return tooth $T_r$ is removed to form a slot $S_r$ to receive the elevated return blade R when cards are in positions 0 and +1. Removal of the righthand portion 27 and lefthand portion 28 of the slot $S_r$ permits desired cards in the +1 position to remain in this position without damage to its tooth $T_r$ when the undesired cards in position 0 are moved rightwardly a substantial distance, for reasons to be described, as the platen 34 moves rightwardly with the R blade raised. The width $W_r$ of the slot $S_r$ can exceed the width $W_r$ shown in the drawings which is equal to twice the width $W_t$ of a single tooth. However, the distance between the shoulder 20 and the return blade R must be equal to the distance between the rear edge of the card 10-1 and the righthand edge of the return tooth R, that is, the distance between shoulder 20 and return blade R must equal the width $W_r$ of the slot $S_r$.

A card is in the "0" position when it has its forward edge 10-3 aligned with the acquisition bar $A_1$ of stationary platen 32. If the rear platen 34 is at the "start" position shown in solid lines in FIG. 1, a card in the 0 position has its rear edge 10-1 in contact with the shoulder 20 at the rear of the platen 34. A card is in the "+1" position when it has been shifted leftwardly one tooth width from the 0 position. A card is in the "1" position when it has been shifted rightwardly one tooth width from the 0 position. In the +1 position the acquisition blade $A_2$ is located immediately to the left of the acquisition tooth $T_a$ of a desired card and when so located will prevent further leftward motion of a desired card in the +1 position when undesired cards in the −1 position are combined with other undesired cards in the 0 position as a consequence of the action of the rear platen 34 moving leftwardly one tooth width from the "select" position to the start position. Such leftward motion of desired cards in the +1 position could occur, were it not for the restraining force of elevated bar $A_2$, due to frictional forces applied to cards in the +1 position by cards in the −1 position which are being combined with undesired cards in the 0 position under the action of shoulder 20 of leftwardly moving platen 34. When a card is in the 0 position the acquisition blade $A_1$ is immediately to the left of the acquisition tooth of the card. Under such circumstances, and assuming the acquisition blade $A_1$ is elevated, which occurs when undesired cards in the −1 positions are combined with undesired cards in the 0 position, the undesired card in the 0 position will be held against further leftward motion by the elevated acquisition bar $A_1$ which can occur due to frictional forces applied by adjacent undesired cards in position −1 are being returned from the −1 position to the 0 position by the leftward movement of the platen from the select position to the start position with its return bar R elevated.

The function of the return blade R, when elevated, is to move rightwardly all undesired cards in the 0 position a substantial distance X-T when the platen 34 moves from the select position a substantial distance X-T following selection of all digits $D_1$, $D_2$, $D_3$, etc. and prior to removal of the desired card from the deck with the device 40 to be described. The return bar also functions, when elevated, following the first digit selection step, that is, the selection of digit $D_1$, to advance desired cards in the 0 position to the +1 position as the undesired cards in the −1 position are returned to the 0 position by the shoulder 20 when the rear platen 34 moves leftwardly from the select position to the start position with the return blade R elevated.

When the return blade R moves all undesired cards rightwardly a distance X-T, to be described, the acquisition bars $A_1$ and $A_2$ are elevated to capture the acquisition tooth $T_a$ of the desired card to prevent rearward movement thereof due to frictional forces applied to the desired card by the rearwardly moving undesired cards.

The distance Z between the code card regions 12 and 14 can be anything, even 0, providing it avoids mechanical interference between the platens 32 and 34 when platen 34 is in the start position, shown in solid lines, which is the leftwardly most position as viewed in FIG. 1. The distance between the rearmost complementary slot $S_9$ and the forwardmost primary slot $S_0$ must be at least equal to $W_t$, although a width of $2W_t$ is preferred to enhance support of the card sorting edge.

To encode a card with a particular digit, the tooth of the primary code region 12 corresponding to that digit is removed, while the tooth of the complementary code region 14 corresponding to the digit to be coded is not removed. For example, if a card to be encoded with the digit "5", tooth $T_5$ of the primary code region 12 is removed, while tooth $T_5$ of the complementary code region 14 is not removed. Similarly, to encode a card with the digit "3", the primary code tooth $T_3$ is removed and the complementary code tooth $T_3$ is not removed. Similarly, to encode a card with the digit "1", the primary code tooth $T_1$ is removed and the complementary code tooth $T_1$ is not removed. Thus, a card such as card 10A encoded with the digits 1-3-5 in accordance with a "3 out of 10" format has only teeth $T_1$, $T_3$, and $T_5$ removed from the primary code region 12 and has teeth remaining in the complementary code region 14 only in complementary code positions $T_1$, $T_3$, and $T_5$. Stated differently, to encode a card with a particular series of digits, the card is notched, that is, code teeth are removed, such that only code teeth T corresponding to the code digits are removed from the primary code region, and the code teeth T in the complementary code region are removed in all code locations except those corresponding to the digit for which card coding is desired. Thus, when a card is coded, for every code location having a tooth present in the complementary code location 14, a tooth T is missing in the primary code region 12 and vice-versa.

Card 10B is encoded with the digits 1-3-7; card 10C with the digits 2-4-6; and card 10D with the digits 7-8-9.

The apparatus of the invention includes the complementary platen 32 which is stationary, and the primary platen 34 which is movable. The complementary platen 32 contains, in a system operating in an "M out of N" format, N−1 complementary blades $C_a$, $C_b$, ... $C_{n-1}$. In a system, such as shown in the preferred embodiment utilizing a "3 out of 10" code format, N−1 complementary blades $C_a$, $C_b$, ... $C_i$ are provided. The complementary blades $C_a$, $C_b$, ... $C_i$ are disposed such that they underlie the blade slots $S_0$, ... $S_9$ of the complementary code region 14 of a card in the 0 position. Obviously, when a desired card is located in the +1 position, as will be described in more detail hereafter, the slots $S_0$, ... $S_9$ of the complementary code region 14 are displaced leftwardly the width of one tooth T relative to the complementary blades $C_a$, ... $C_i$. When an undesired card is in the −1 position during the card selection operation, as will be more apparent hereafter, the complementary code region slots $S_0$ ... $S_9$ are displaced rightwardly the width of one tooth T relative to the complementary blades $C_a$, ... $C_i$. The function of the complementary blades $C_a$ ... $C_i$ is to prevent rightward movement of desired cards, that is, to prevent rightward movement of a desired card encoded with digit D during the digit selection operation for that digit D when the primary platen 34 moves from the start position shown in solid lines to the select position shown in dotted lines, effectively withdrawing to the right from the desired cards, cards encoded with digit D, the undesired cards which are not encoded with the digit D then being selected. Thus, the complementary blades restrain rightward movement of desired cards which contain teeth in the complementary code regions at those digit positions corresponding to the digits of the desired card undergoing selection.

The complementary platen 32 also contains acquisition bars $A_1$ and $A_2$ located to the immediate right and left, respectively, of a card in the 0 position. As previously discussed, the acquisition bar $A_2$ prevents leftward movement of a desired card in the +1 position when the primary platen 34 shifts leftwardly from the select position to the start position with its return bar R elevated to return undesired cards in the −1 position to the 0 position. The acquisition blade $A_1$, when elevated, functions to prevent leftward movement of undesired cards in the 0 position when undesired cards in the −1 position are returned to the 0 position by leftward motion of the primary platen 34 as it moves from the select position to the start position with its return blade R elevated. Additionally, elevated acquisition blade $A_1$ prevents rightward movement of a desired card in the +1 position when the undesired cards move rightwardly by the elevated return bar R at the end of selection of add digits when the platen 34 shifts from the start position a distance X-T to the right.

The movable primary platen 34 contains N−1 primary selection blades in an "M out of N" code system. If, as in the preferred embodiment, N=10, there are 9 primary blades $P_a \ldots P_i$. The movable primary platen 34 is shiftable rightwardly from a start position in which blades $P_a \ldots P_i$ underlie blade slots $S_0 \ldots S_9$ of the primary code region 12 of a card in the 0 position with its edge 10-1 against shoulder 20, to a select position 34', shown in dotted lines, displaced rightwardly the width of one tooth. In addition to shifting between the start position (solid lines) and a select position (dotted lines) displaced rightwardly from the start position the width of one tooth, the movable primary platen 34 also shifts rightwardly from the start position a predetermined distance X-T to the phantom line position, for reasons to be described hereafter.

The movable primary platen 34 also contains the previously described return blade R. The return blade R is displaced rightwardly of the last primary select blade $P_i$ by a distance 2W equal to the width of two teeth T. When the primary platen 34 is in the select position following the first digit selection operation, i.e., digit $D_1$, the return blade R is positioned immediately rightwardly of the return tooth $T_r$ of desired cards in the 0 position such that when the platen 34 is shifted from the select position to the start position the desired cards are shifted from the 0 position to the +1 position. After all digits $D_1, D_2, \ldots D_n$ have been selected, such as after digits $D_1, D_2,$ and $D_3$ in a "3 out of 10" code format have been selected, the return bar R is located immediately to the right of the return tooth $T_r$ of the desired card, and immediately to the left of the return tooth $T_r$ of the undesired cards. So located, when the platen 34 shifts from the start position a distance X-T to the right with return bar R elevated, only the undesired cards move rightwardly a distance X-T. The primary platen 34 includes a vertical shoulder 20 spaced rightwardly from the return blade R a distance equal to the width 2W of two teeth T. When the primary platen 34 is in the select position following the first digit selection step, that is, digit $D_1$, the shoulder 20 moves undesired cards in the −1 position to the 0 position as the platen 34 moves from the select position to the start position. Following digit selection steps other than the first digit $D_1$, when the primary platen 34 is in the select position the shoulder 20 engages the edge 10-1 of undesired cards in the −1 position and moves them leftwardly to the 0 position as the platen 34 returns from the select position to the start position.

Also included in the card selection apparatus of this invention is a selected card removal device 40. The device 40 is positioned a distance slightly less than X-T from the position occupied by the leading edge 10-3 of a selected card located in the +1 position following completion of the last digit selection step, which in the preferred embodiment of the invention wherein a "3 out of 10" format is used, occurs following the selection of digit $D_3$. As a consequence of the location of the selected card removal device 40 in the manner described, up through conclusion of the selection of the last digit (digit $D_3$ in a "3 out of 10" code format) the desired cards are not advanced leftwardly sufficiently to be engaged by the device 40. However, at the conclusion of the card selection operation when the desired card is in the +1 position and the undesired cards are in the 0 position, and the movable primary platen 34 is sequentially shifted rightwardly a distance X-T to its rightmost position 34| (phantom lines) and then leftwardly a distance X-T to its 0 position, the desired card is moved leftwardly a distance X-T from the +1 position to bring the desired card from the +1 position leftwardly a distance X-T where it can be removed by the device 40. Undesired cards which are displaced rightwardly with respect to the desired card by the width W of one tooth T at the end of the card selection operation, even though displaced from the 0 position rightwardly a distance X-T and then leftwardly therefrom a distance X-T, are not removed by the device 40 since they are never leftward of the 0 position, that is, they are always displaced rightwardly from the device 40 by a distance of at least X following selection of the desired card, even though the desired card is moved to device 40.

As will be described more fully hereinafter, prior to a card selection operation all of the cards are in the solid line position shown in FIG. 1, which is hereinafter referred to as the "0" position, with their lower sorting edges supported on the upper surfaces 32a and 34a of platens 32 and 34. Following the first digit selection step, wherein cards encoded with the first code digit $D_1$, are selected, the undesired cards, not coded with the first digit $D_1$, are located rearwardly, that is, rightwardly as viewed in FIG. 1, to the dotted line position hereinafter referred to as the "−1" position wherein the undesired cards are spaced one tooth width rearwardly or rightwardly from the 0 position. Before the second digit selection step is carried out, that is, selection of cards encoded with the digit $D_2$, the entire deck of cards, both desired and undesired cards, are shifted as a whole one tooth width forwardly, that is, leftwardly as viewed in FIG. 1, such that the desired cards coded with the first digit $D_1$, are located in the "+1" position, and the undesired cards not coded with the first digit $D_1$ are in the 0 position. The desired cards are leftwardly shifted from the 0 position to the +1 position by the return blade R which engages the right edge of the return tooth $T_r$ of the desired cards, while the undesired cards are leftwardly shifted from the −1 position to the 0 position by shoulder 20 which engages rear card edge 10-1 of the undesired cards. In the +1 position the desired cards having digit $D_1$ are located forwardly, that is, leftwardly as viewed in FIG. 1, with respect to the undesired cards which are in the 0 position by a distance equal to the width of a tooth.

With the desired cards bearing digit $D_1$ in the +1 position and the undesired cards in the 0 position, the second digit selection step is carried out, leaving the desired cards, that is, cards having both desired digit $D_1$ and $D_2$, in the +1 position and the undesired cards not having both digits $D_1$ and $D_2$ collectively in the 0 and −1 positions. Subsequent to the second digit selection step, but prior to the third digit selection step, the undesired cards which are collectively in the 0 and −1 positions, are combined into a single group at the 0 position by the shoulder 20 of platen 34 which engages the trailing edge 10-1 of the undesired cards in the −1 position. Thereafter the third digit selection step is carried out, leaving desired cards having all of the desired digits $D_1$, $D_2$, and $D_3$ in the +1 position, and the undesired cards collectively in the 0 and −1 positions. The undesired cards not having all digits $D_1$, $D_2$, and $D_3$, which collectively occupy the 0 and −1 positions, are combined into the 0 position. The digit selection process is repeated until all M digits of the "M out of N" code format have been selected.

During the combining of the undesired cards collectively from two subgroups, namely, the 0 position and the −1 position, into a single group at the 0 position, which occurs between digit selection operations except between the first two digits $D_1$ and $D_2$, the acquisition bars $A_1$ and $A_2$ are elevated. The $A_2$ bar engages the leading edge 10-3 of the desired cards in the +1 position to prevent them from being pushed leftwardly under frictional forces exerted upon them by undesired cards which are being shifted from the −1 position to the 0 position by the rear shoulder 20 of the rear platen 34. The acquisition blade $A_1$ when elevated engages the leading edge of undesired cards in the 0 position to prevent these cards from being frictionally advanced to the +1 position when the undesired cards in the −1 position are advanced by the shoulder 20, to join the other undesired cards which remain in the 0 position during the recombination step.

Following selection of all digits, the undesired cards in the 0 position are retracted a distance X-T to the right relative to the desired card in the +1 position, and the entire deck of cards shifted leftwardly a distance X-T to place the desired card in operative relation to the selected card removal device 40, all in a manner to be more fully described hereafter.

Figure 2:
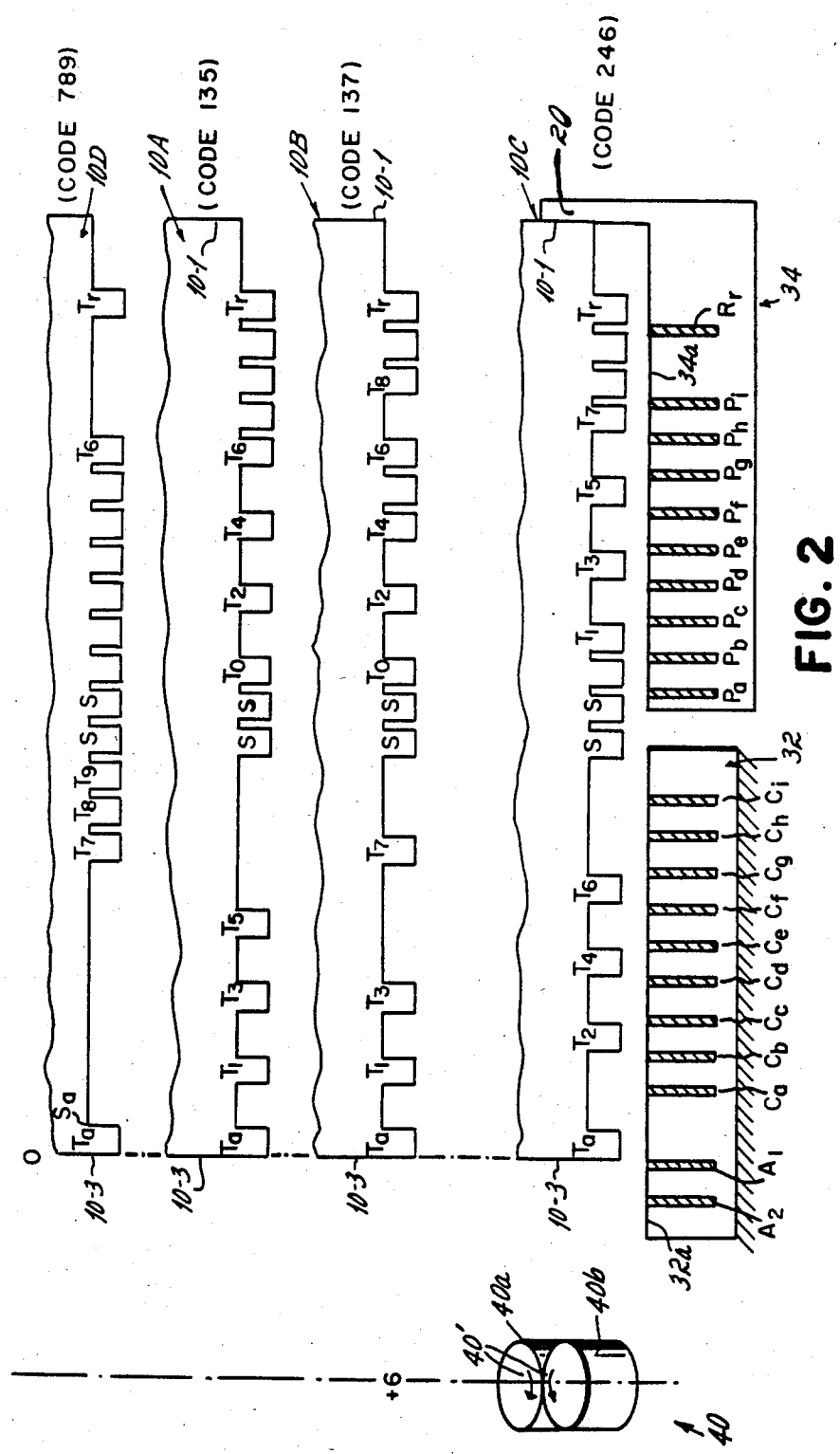

With reference to FIGS. 2-19, a typical card selection operation will be described in which a card 10A encoded with the digits 1-3-5 is desired to be selected from among a group of undesired cards including undesired cards 10B, 10C, and 10D encoded with the digits 1-3-7, 2-4-6, and 7-8-9. With reference to FIG. 2, at the start of a card selection operation the primary platen 34 is in its leftwardmost, or start, position, shown in solid lines, and the cards are all vertically disposed in a deck with their lower sorting edges seated on the upper surfaces 32a and 34a of the platens 32 and 34 with their rear edges 10-1 urged into contact with the vertical shoulder 20 of the platen 34. With the cards so located, the acquisition bar $A_1$ is located immediately to the left of the leading edge 10-3 of the cards, that is, immediately leftwardly of the acquisition tooth $T_a$. Additionally, complementary sort blades $C_a, \ldots C_i$ are located immediately rearwardly of the complementary card teeth $T_0$, $\ldots T_8$ of complementary code zone 14 in slots $S_0, \ldots S_8$, and primary sort blades $P_a, \ldots P_i$ are located immediately forwardly (leftwardly) of primary teeth $T_0, \ldots T_8$ in slots $S_0$-$S_8$ of the primary code teeth zone 12. The return blade R is located in alignment with the slot immediately leftwardly of the return tooth $T_r$. At the start of a card selection cycle all of the blades $A_2$, $A_1$, $C_a, \ldots C_i$, $P_a, \ldots P_i$, and R are in their nonelevated or retracted position. Additionally, the leading edge 10-3 is located a distance X from the selected card removal device 40, which may be the nip of a pair of rollers 40a and 40b driven in the direction of the arrows 40'. The foregoing relationship of the cards with respect to the various blades of the selector and the selected card removal device 40 is shown clearly in FIG. 2.

Following placement of the platen and the cards in the position shown in FIG. 2, the primary and complementary blades underlying the slots S operatively associated with the first digit $D_1$ of the encoded card desired are elevated. In the illustration given in which it is assumed the desired card is encoded with the digits 1-3-5, complementary blade $C_b$ underlying slot $S_1$ located rightwardly of tooth $T_1$ of the complementary tooth zone 14 is elevated as is the primary blade $P_b$ underlying slot $S_1$ located leftwardly of the removed tooth $T_1$ of code zone 12 of the desired card 10a. With blades $C_b$ and $P_b$ elevated, it is noted that blade $C_b$ is located rightwardly of tooth $T_1$ of the desired card 10A in tooth zone 14 such that when the platen 34 is moved rightwardly the desired card 10A, which does not have tooth $T_1$ of the complementary zone 14 removed, will be retained in the position shown in FIG. 3 relative to the complementary platen 32.

Figure 3:
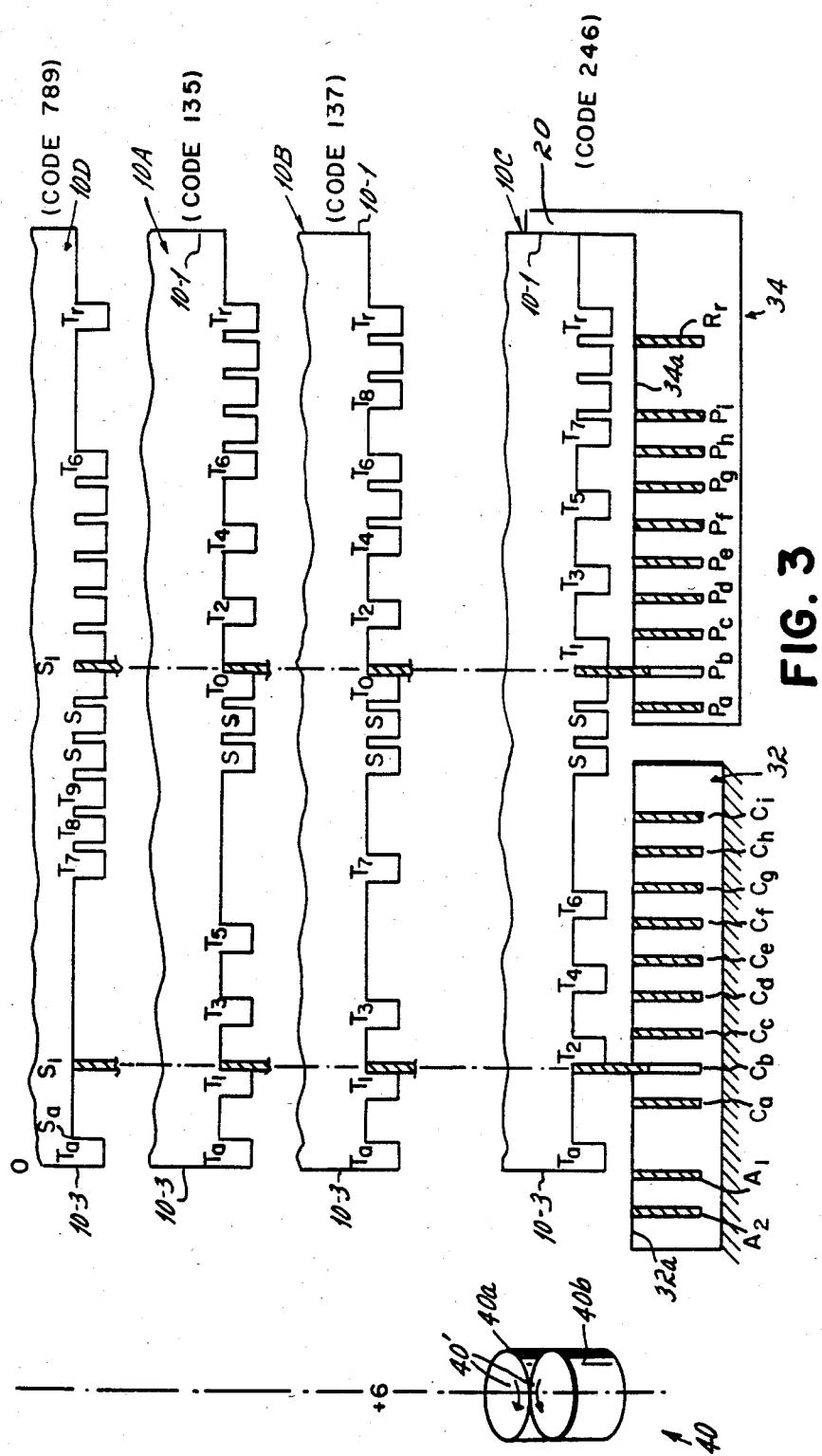
Figure 4:
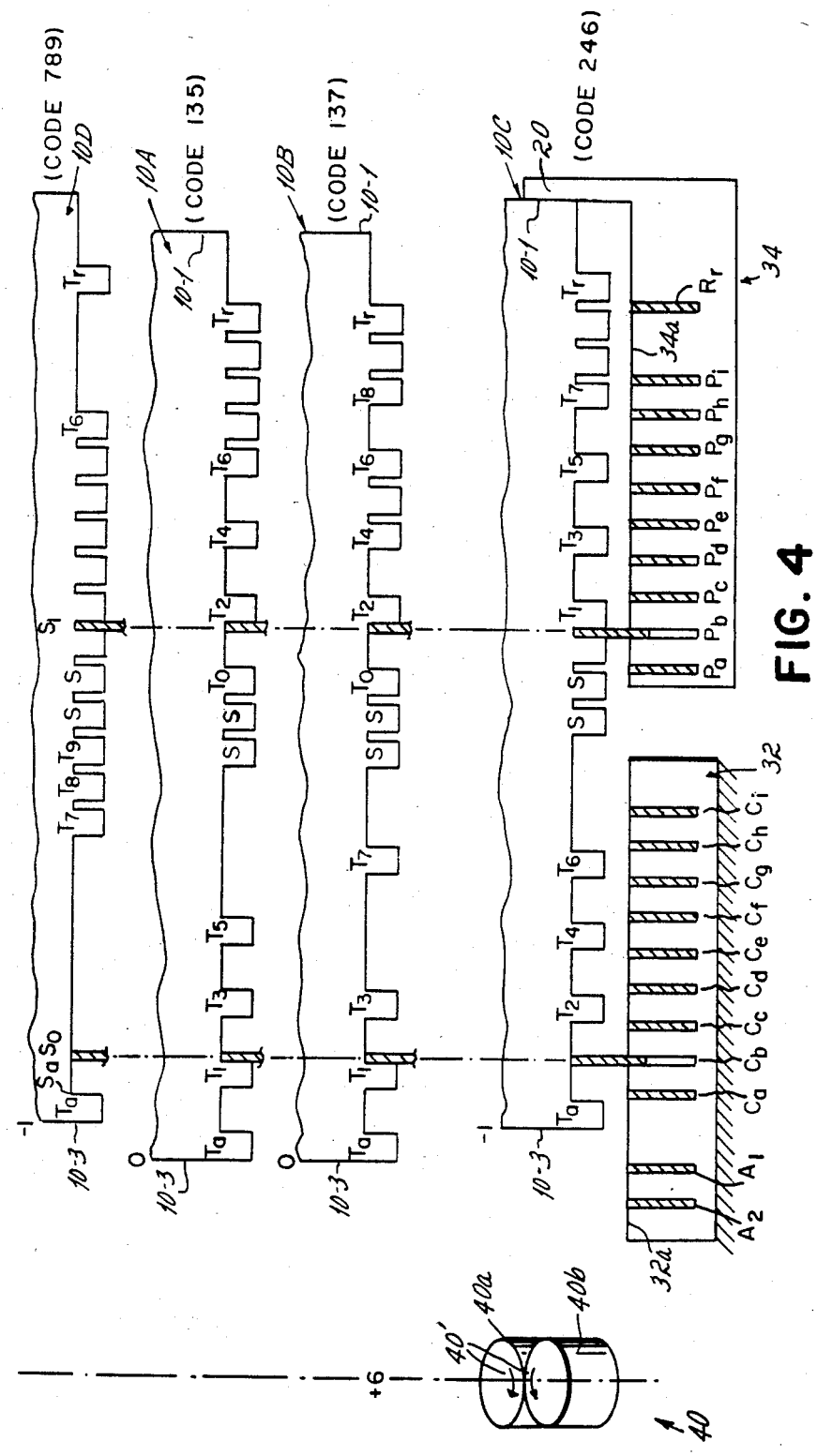

Additionally, it is noted that the primary blade $P_b$ which is located in slot $S_1$ of tooth zone 12 of the desired card 10A is free to move rightwardly when the platen 34 moves from the start position shown in FIG. 3 to the select position shown in FIG. 4 without moving the desired card 10A. The same relationship which exists between elevated blades $C_b$ and $P_b$ and card 10A also exists between elevated blades $C_b$ and $P_b$ and card 10B inasmuch as both cards 10A and 10B are encoded with the digit "1". As a consequence, when the platen 34 moves from the start position shown in FIG. 3 to the select position shown in FIG. 4, card 10B will remain stationary relative to complementary platen 32.

Card 10C has the complementary blade $C_b$ engaged in slot $S_1$ to the left of which the complementary tooth $T_1$ has been removed, and has the primary blade $P_b$ located in slot $S_1$ to the right of which the primary code tooth $T_1$ has not been removed. The same is true for card 10D as is true for card 10C since neither card is encoded with the digit "1".

As a consequence of the foregoing, when the primary platen 34 moves rightwardly from the start position (FIG. 3) to the select position (FIG. 4), the primary blade $P_b$ will engage primary code tooth $T_1$ of undesired cards 10C and 10D and move the cards 10C and 10D, which are not encoded with the digit "1", rightwardly from the 0 position shown in FIG. 3 to the −1 position shown in FIG. 4, which motion is permitted with respect to elevated complementary blade $C_b$ by reason of the fact that complementary tooth $T_1$ of cards 10C and 10D has been removed.

To accomplish the first digit selection step, that is, to select digit $D_1$ which in the example of the preferred embodiment is the digit "1", the primary platen 34 with complementary select bar $C_b$ and primary select bar $P_b$ elevated is shifted from the start position shown in FIG. 3 to the select position shown in FIG. 4 rightwardly the width W of a tooth T. As noted, cards 10A and 10B which are encoded with the digit "1" remain stationary relative to the primary platen 32 by reason of engagement of the elevated complementary select bar $C_b$ and the righthand edge of the unremoved complementary code tooth $T_1$. Cards 10A and 10B can remain stationary relative to the complementary platen 32 notwithstanding that the primary platen 34 is moving rightwardly with its blade $P_b$ elevated by reason of the fact that primary code tooth $T_1$ has been removed allowing the elevated primary code bar $P_b$ to move relative to cards 10A and 10B from a position in alignment with primary slot $S_0$ to a position in alignment with primary slot $S_1$. At this point the cards 10A and 10B encoded with the digit "1" are in the 0 position, and the undesired cards 10C and 10D which are not encoded with the digit "1" are in the $-1$ position for reasons heretofore described.

Figure 5:
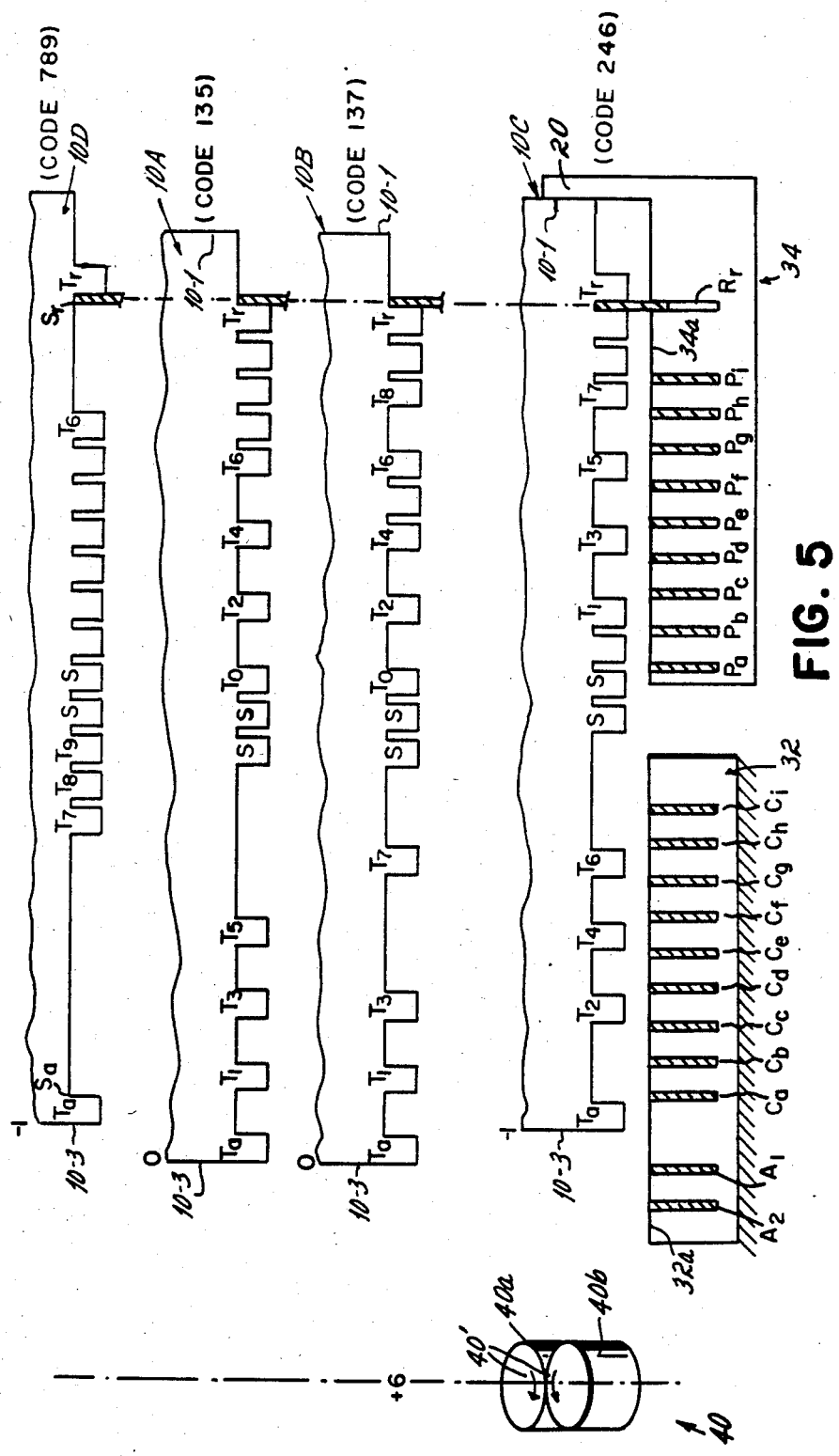
Figure 6:
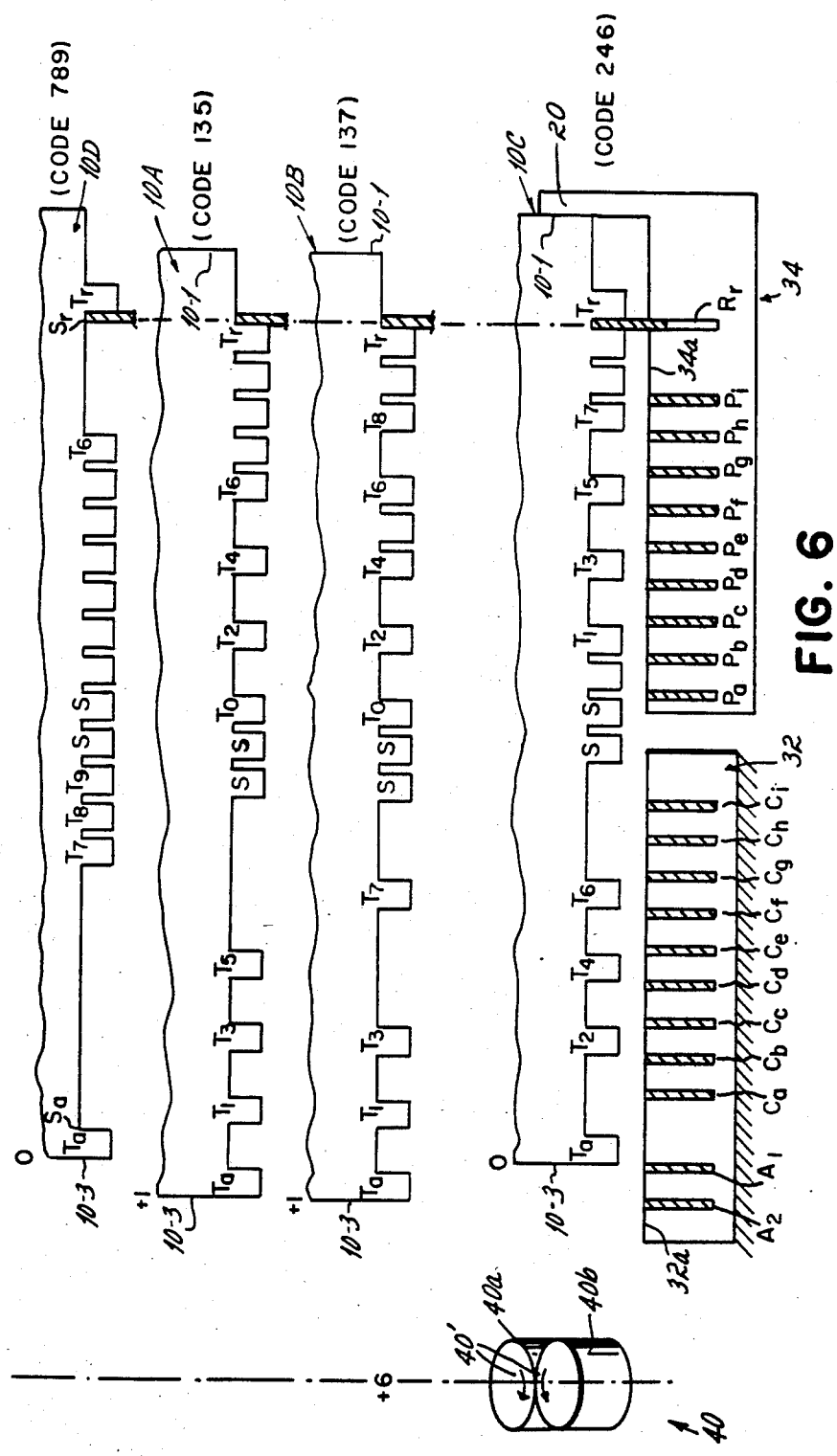

To prepare for the second digit selection step, that is, selection of the digit $D_2$ which in the example, has a value "3", the complementary code blade $C_b$ and the primary code blade $P_b$ are both lowered, and the return blade R is elevated to produce the card, blade, and platen relationship shown in FIG. 5. As seen in FIG. 5, the elevated return bar R is located rightwardly of the return tooth of cards 10A and 10B coded with digit $D_1$ ("1") which are in the 0 position and the shoulder 20 of the movable primary platen 20 is engaged with the rear edge 10-1 of the cards 10C and 10D in the $-1$ position which are not coded with digit $D_1$ ("1"). The movable primary platen 34 is now moved leftwardly from the select position shown in FIG. 5 to the start position shown in FIG. 6 which is effective to move all cards one tooth width leftwardly. The elevated return bar R which is in engagement with the righthand edge of the cards 10A and 10B encoded with digit $D_1$ ("1") shifts these cards from the 0 position to the $+1$ position as the primary platen 34 moves from the select position to the start position. The vertical shoulder 20 on the movable platen 34 moves the cards 10C and 10D, which are not encoded with digit $D_1$ ("1"), from the $-1$ position to the 0 position as the movable platen 34 shifts leftwardly from the select position to the start position. The cards, platen, and blades now occupy the relative relationship shown in FIG. 6.

To commence the second digit selection step, that is, selection of digit $D_2$ which in the example has a value of "3", the complementary code bar $C_c$ underlying slot $S_3$ rightwardly of complementary tooth position $T_3$ of cards in the $+1$ position is elevated. Also elevated is primary select bar $P_c$ aligned with slot $S_3$ to the left of tooth $T_3$ of cards in the 0 position. It will be remembered that all cards in the $+1$ position have digit $D_1$ ("1"), and that all cards in position 0 do not have digit $D_1$ ("1"). With the blades $C_c$ and $P_c$ elevated, note that cards in the $+1$ position encoded with the digit "3" (and also digit "1") are prevented from moving rightwardly relative to the platen 32 by reason of the fact that the elevated complementary sort bar $C_c$ is located immediately rightwardly of tooth $T_3$ of cards in the $+1$ position, such as cards 10A and 10B. As a consequence, when the primary platen 34 shifts rightwardly from the start position (FIG. 7) to the select position (FIG. 8), cards in the $+1$ position, which include all cards previously selected having the digit $D_1$, which in the example of the preferred embodiment is the value "1", such as cards 10A and 10B, will be retained against movement relative to the stationary platen 32 by engagement of the elevated complementary select bar $C_c$ and the code teeth $T_3$ of cards 10A and 10B. By reason of the fact that cards 10A and 10B have their primary tooth $T_3$ removed, when the primary platen 34 moves rightwardly with the primary select blade $P_c$ elevated, previously selected cards in the $+1$ position which are encoded with the digit "3" (and digit "1") will be permitted to remain stationary relative to the platen 32. Also note that card 10C and which is in the 0 position by reason of the fact that it did not contain the digit $D_1$, which in the example of the preferred embodiment has a value of "1", will remain stationary relative to the platen 32 when the platen 34 moves rightwardly with complementary blade $C_c$ and primary blade $P_c$ elevated to select digit $D_2$ ("3") by reason of the fact that card 10C is encoded with the digit "2" which, when in the 0 card position occupied by previously unselected cards not having the digit $D_1$ ("1"), is aligned with the digit $D_3$ ("3") of the desired cards which are in the $+1$ position. Thus, previously unselected cards in the 0 position encoded with a "2" remain stationary during the second digit selection step, $D_2$ ("3"), which are in the $+1$ position.

Figure 7:
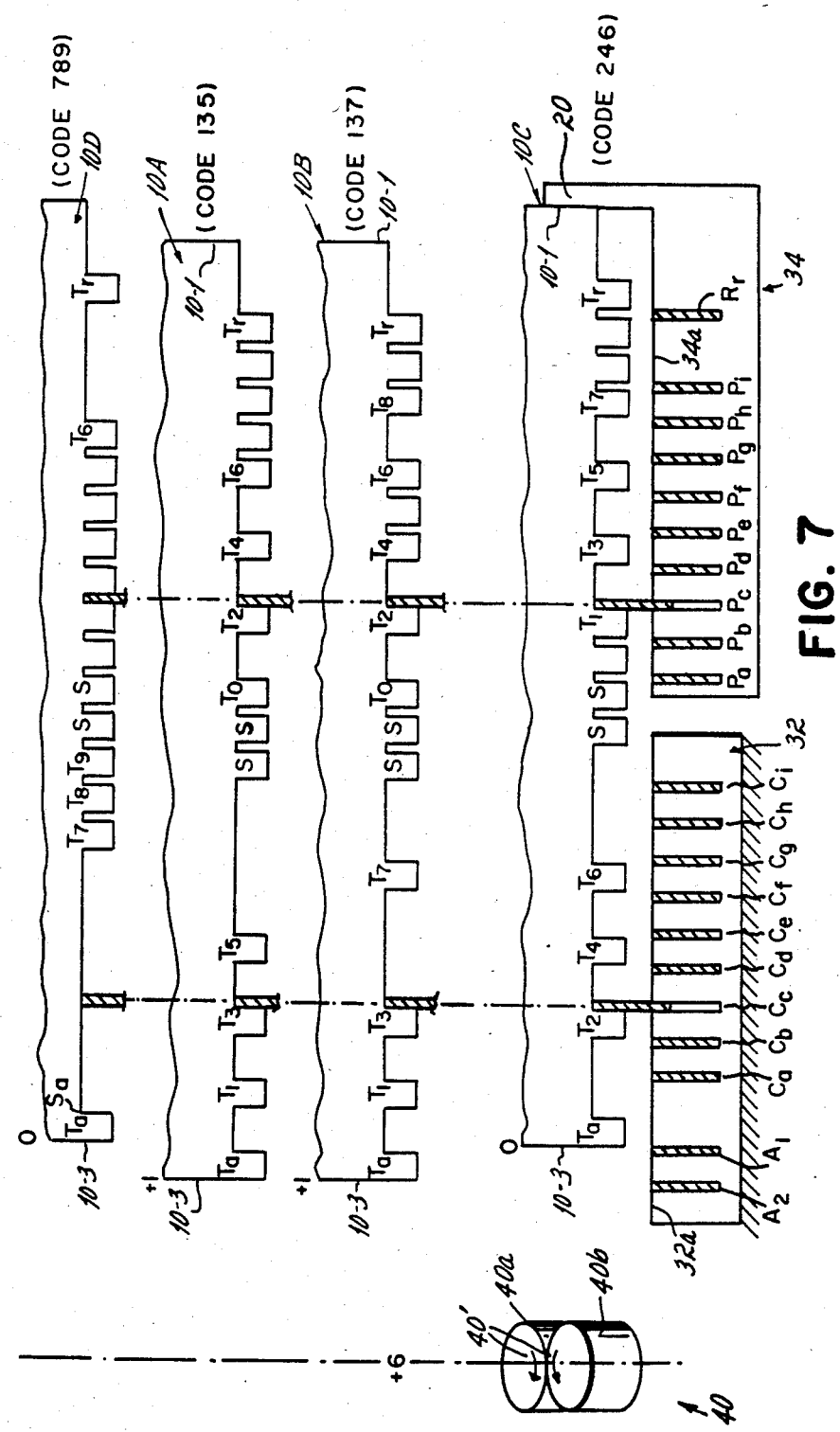
Figure 8:
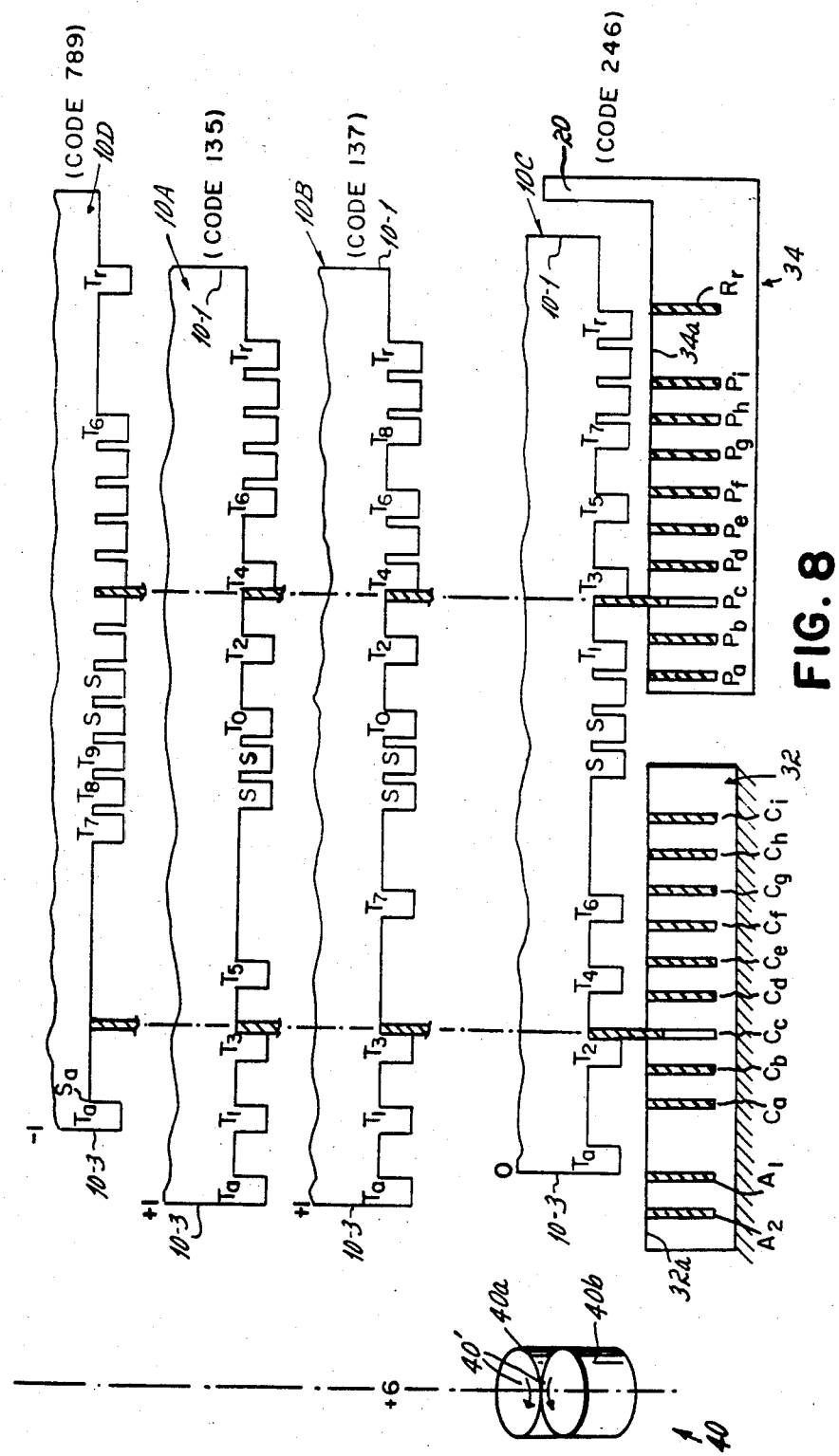

To accomplish the second digit selection step, that is, selection of the digit $D_2$ which in the example of the preferred embodiment has a value of "3", the primary platen 34 is moved from the position shown in FIG. 7 which is the start position to the select position shown in FIG. 8. Movement of the platen 34 to the select position shown in FIG. 8 with the code bars corresponding to the digit "3" elevated is effective to shift card 10D from the 0 position to the $-1$ position by reason of the engagement of the primary select blade $P_c$ with the lefthand edge of the primary code tooth $T_2$ which is not removed. This movement to the $-1$ position from the 0 position of card 10D is not inhibited by elevated complementary select blade $C_c$ by reason of the fact that complementary code tooth $T_1$ of card 10d has been removed. Note also that card 10C which was not selected as a consequence of the first digit selection step $D_1$ by reason of the fact that card 10C is not encoded with the value "1", remains in the 0 position, as described previously. Also note in FIG. 8 that cards containing both previously selected digits $D_1$ ("1") and $D_2$ ("3") are in the $+1$ position, such as cards 10A and 10B; and that cards not having both the digit $D_1$ ("1") and digit $D_2$ ("3") are in either the 0 position, such as card 10C, and in the $-1$ position, such as card 10D.

Figure 9:
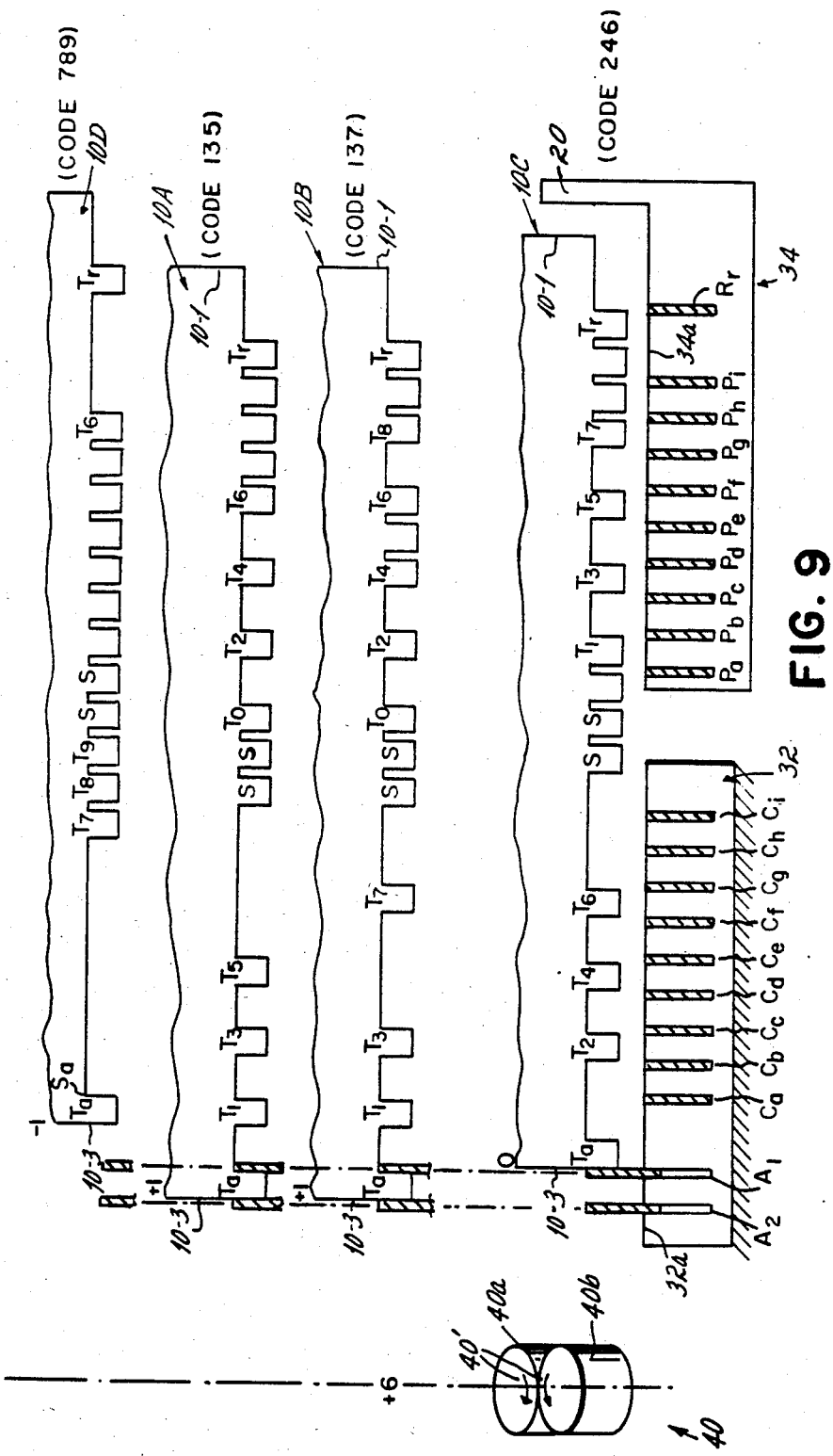
Figure 10:
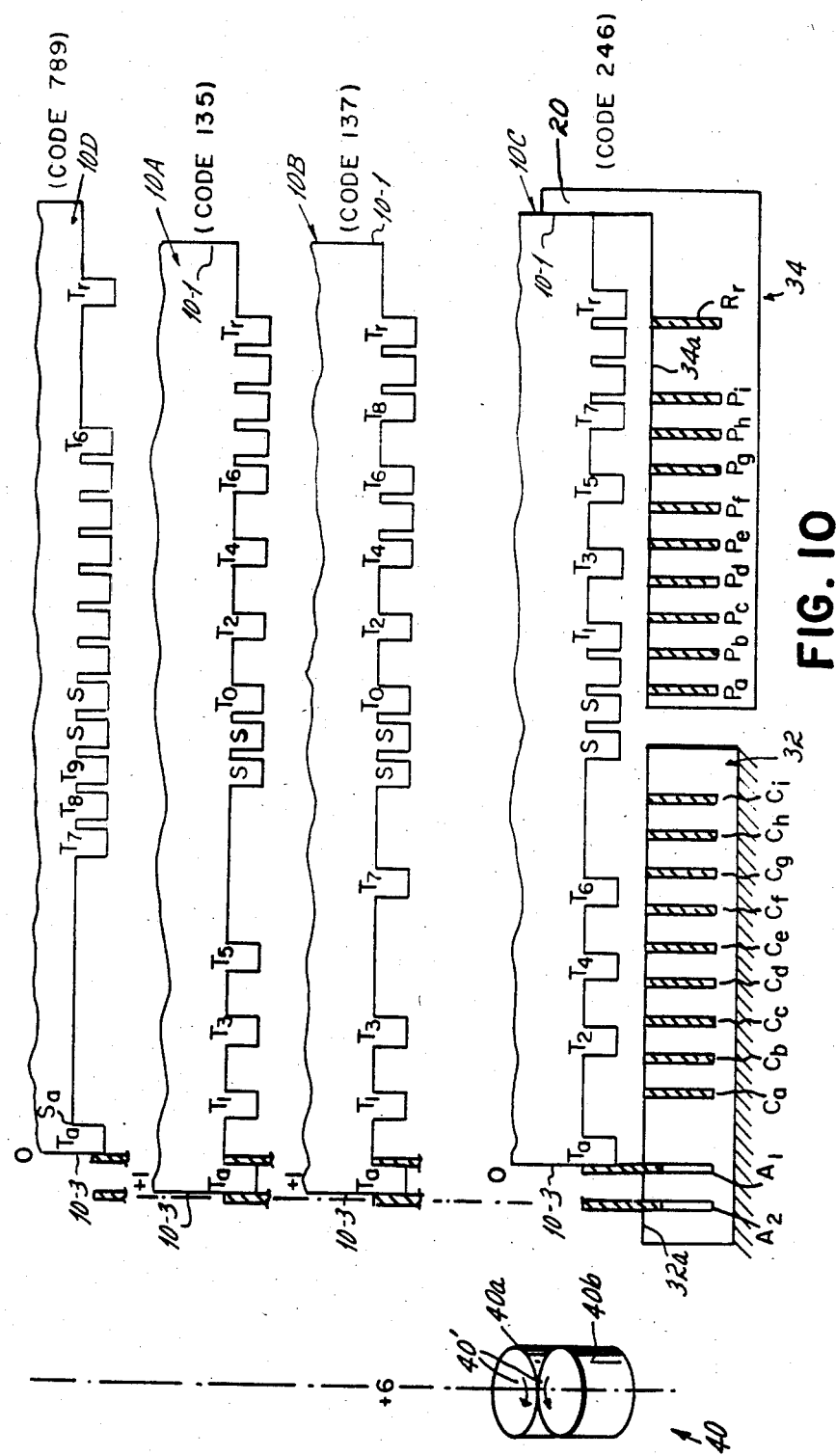

To prepare for the third digit selection step, that is, the selection of digit $D_3$ which in the example of the preferred embodiment has a value of "5", the undesired cards 10 in positions 0 and 1 are combined into a single group of undesired cards in position 0. This is accomplished, as shown in FIG. 9, by lowering the $D_2$ select bars, in this case complementary code blade $C_c$ and primary code blade $P_c$, and elevating the acquisition blades $A_1$ and $A_2$. The return bar R is not elevated. With the acquisition blades $A_1$ and $A_2$ elevated, the movable primary platen 34 is shifted leftwardly from the select position shown in FIG. 9 to the start position shown in FIG. 10. Movement of the primary platen 34 in the manner indicated is effective to shift card 10D from the −1 position to the 0 position by reason of the engagement of platen shoulder 20 with trailing edge 10-1 of card 10D. Undesired card 10C which is in the 0 position prior to leftward shifting of the primary platen 34 from the select position to the start position remains in position 0 by reason of engagement of elevated acquisition bar $A_1$ with the left edge of the acquisition tooth $T_a$ of card 10C. Cards 10A and 10B, which are in the +1 position by reason of having both digits $D_1$ ("1") and $D_3$ ("3"), remain in the 1 position by reason of engagement of the elevated acquisition blade $A_2$ with the leading edge 10-3 of cards 10A and 10B.

To commence the third digit selection step, that is, selection of the digit $D_3$ which in the example of the preferred embodiment has a value "5", the complementary code bar $C_e$ is elevated corresponding to the digit "5" located rightwardly of the tooth $T_5$ of the desired card 10A in position +1, which has all of the desired digits $D_1$, $D_2$, and $D_3$. Also, the primary sort blade $P_e$ is elevated which is located leftwardly of primary code tooth $T_5$ in slot $S_5$ of the desired card 10A having all digits of the desired card, namely, digits $D_1$, $D_2$, and $D_3$. The relationship of elevated blades $C_e$ and $P_e$ relative to card 10A is such that when the movable platen 34 is shifted from the start position shown in FIG. 11 to the select position shown in FIG. 12, the desired card 10A having all digits $D_1$, $D_2$, and $D_3$ will remain stationary relative to the fixed platen 32. Thus, the desired card 10A will remain in the +1 position.

With respect to undesired card 10C located at the 0 position, this card will not move from the 0 position to the −1 position when platen 34 is shifted to the select position, but will remain in the 0 position by reason of the fact that primary code tooth $T_4$ located rightwardly of elevated primary select blade $P_e$ has been removed; also complementary code teeth $T_4$ located to the left of elevated complementary select blade $C_e$ has not been removed. Thus, undesired card 10C remains in the 0 position when the platen 34 shifts to the select position to effect selection of digit $D_3$ ("5"). Undesired card 10D which is also in the 0 position will shift to the −1 position when platen 34 shifts to the select position with blades $C_e$ and $P_e$ elevated by reason of the fact that primary code tooth $T_4$ located rightwardly of primary select bar $P_e$ has not been removed and complementary code tooth $T_4$ located leftwardly of elevated complementary select blade $C_e$ has been removed. Undesired card 10B which is in the +1 position will be shifted to the 0 position when platen 34 shifts to the select position with blades $C_e$ and $P_e$ elevated by reason of the fact that primary code tooth $T_5$ located to the right of elevated primary select blade $P_e$ has not been removed and complementary code tooth $T_4$ located to the left of elevated complementary sort blade $C_e$ has been removed.

Figure 11:
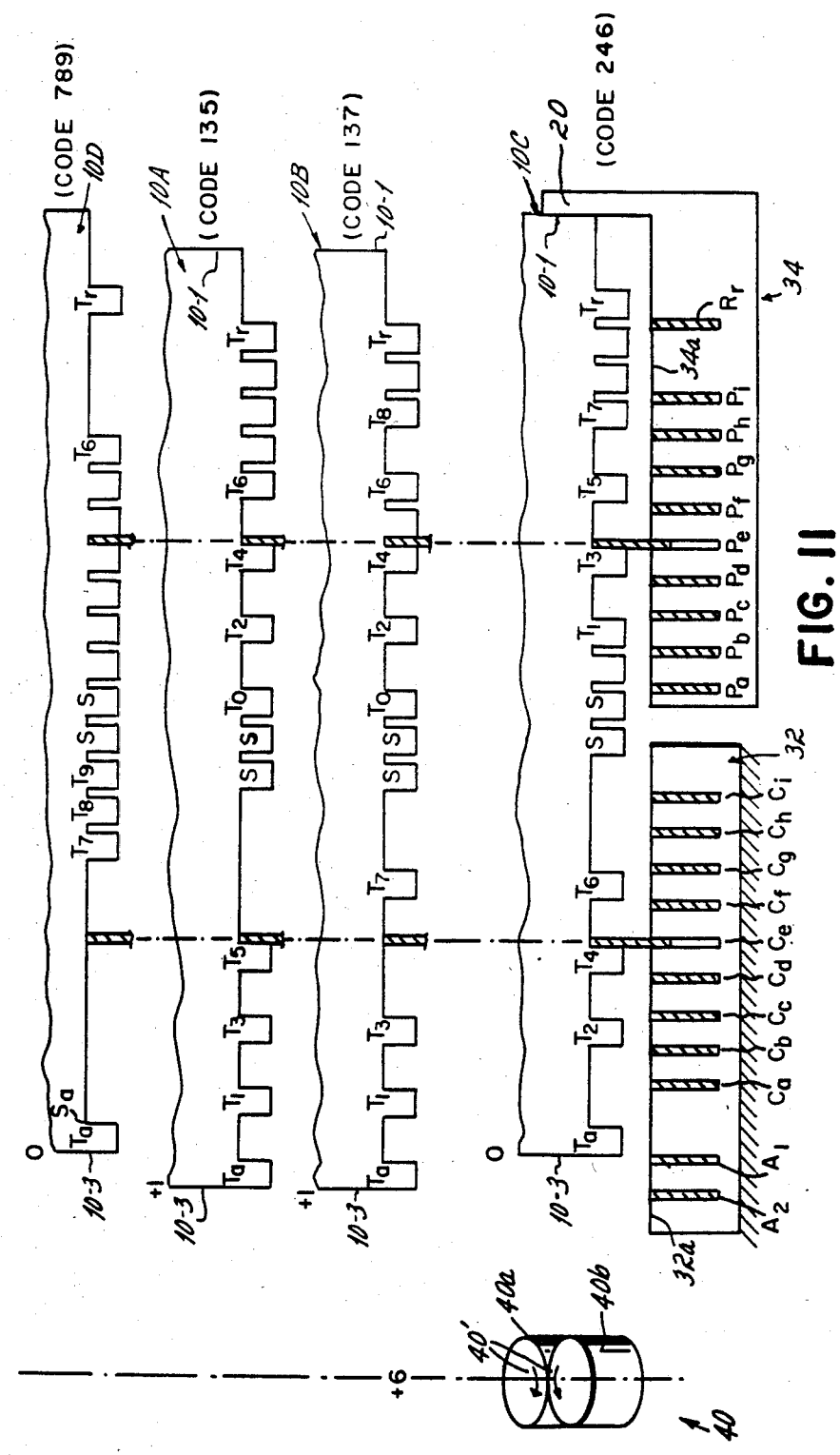
Figure 12:
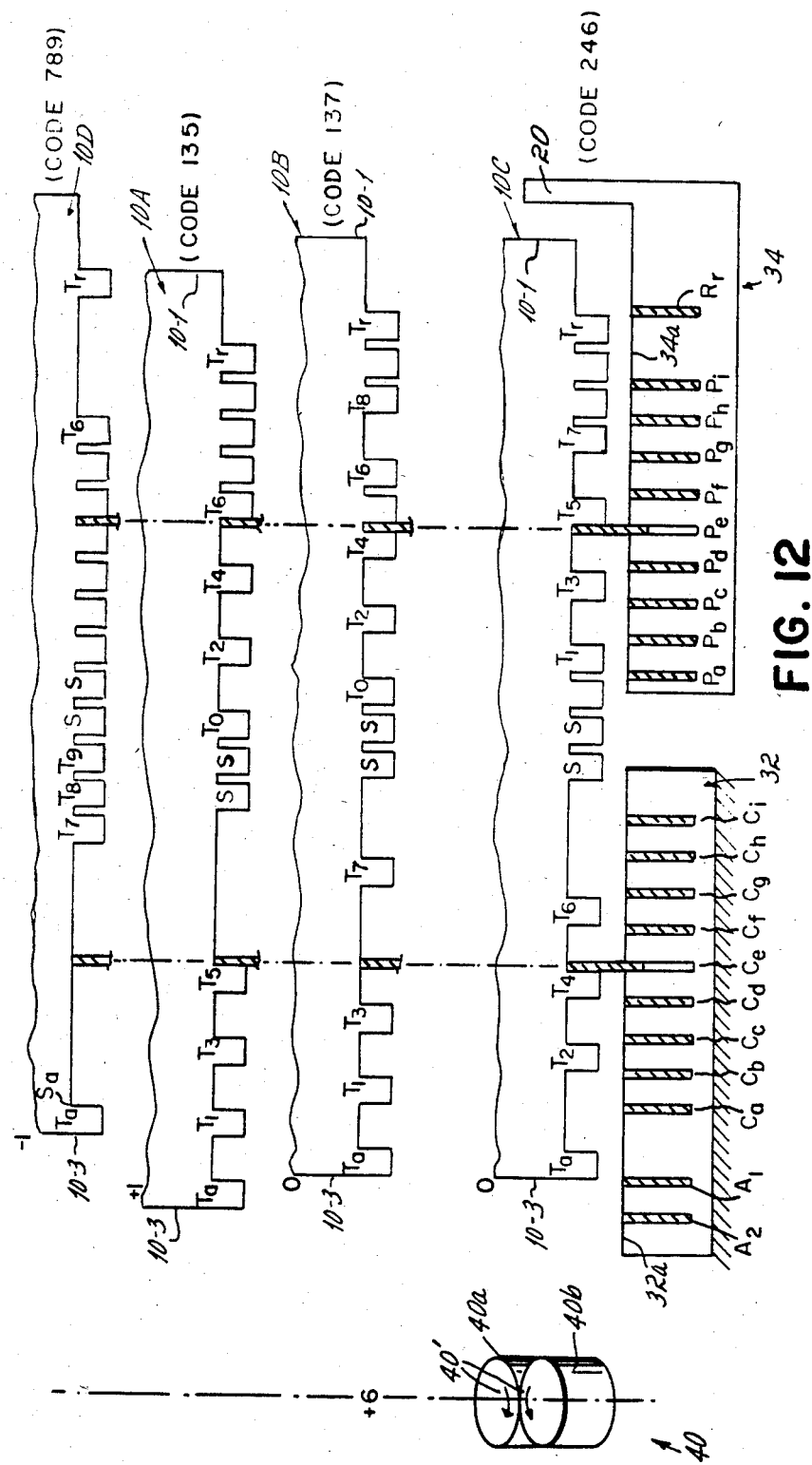

To accomplish the third digit selection operation the movable platen 34 is shifted from the position shown in FIG. 11 to the position shown in FIG. 12 with the sort bars $C_e$ and $P_e$ elevated. Rearward movement of the platen 34 with sort bar $P_e$ elevated shifts undesired card 10B rightwardly from the +1 position to the 0 position, and shifts undesired card 10D rightwardly from the 0 position to the −1 position. Undesired card 10C which was in the 0 position remains in the 0 position by reason of engagement of elevated sort bar $C_e$ with the complementary code tooth $T_4$. Desired card 10A remains in the +1 position by reason of engagement of elevated complementary sort bar $C_e$ and code tooth $C_5$. Card 10A is free to remain stationary when platen 34 moves to the select position, notwithstanding that primary sort blade $P_e$ is elevated, by reason of the fact that primary code tooth $T_5$ of card 10A has been removed. At this point, and as shown in FIG. 12, the desired card 10A is in the +1 position and the remaining undesired cards are either in the 0 position (10B and 10C) or in the −1 position (10D).

Figure 13:
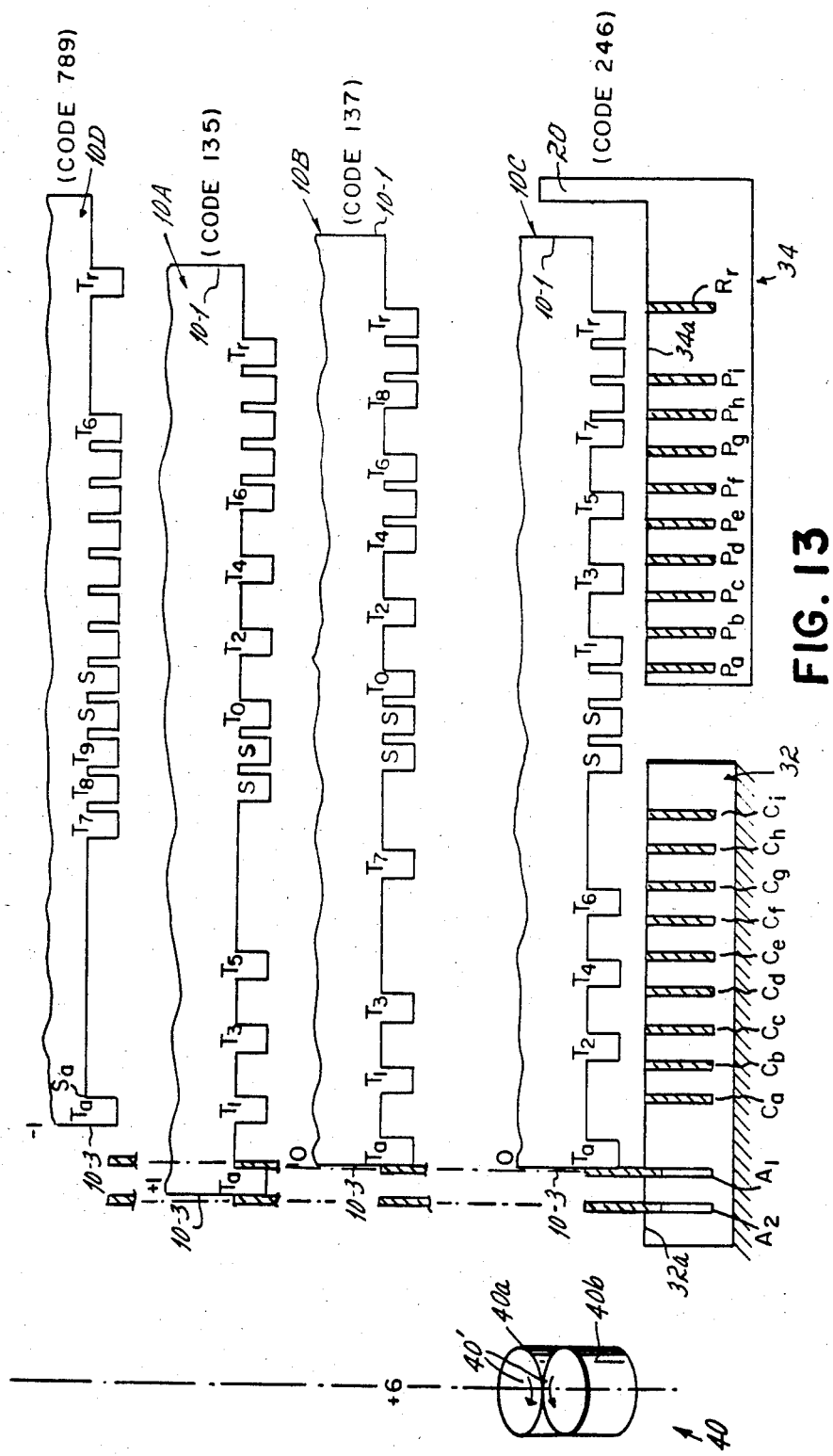
Figure 14:
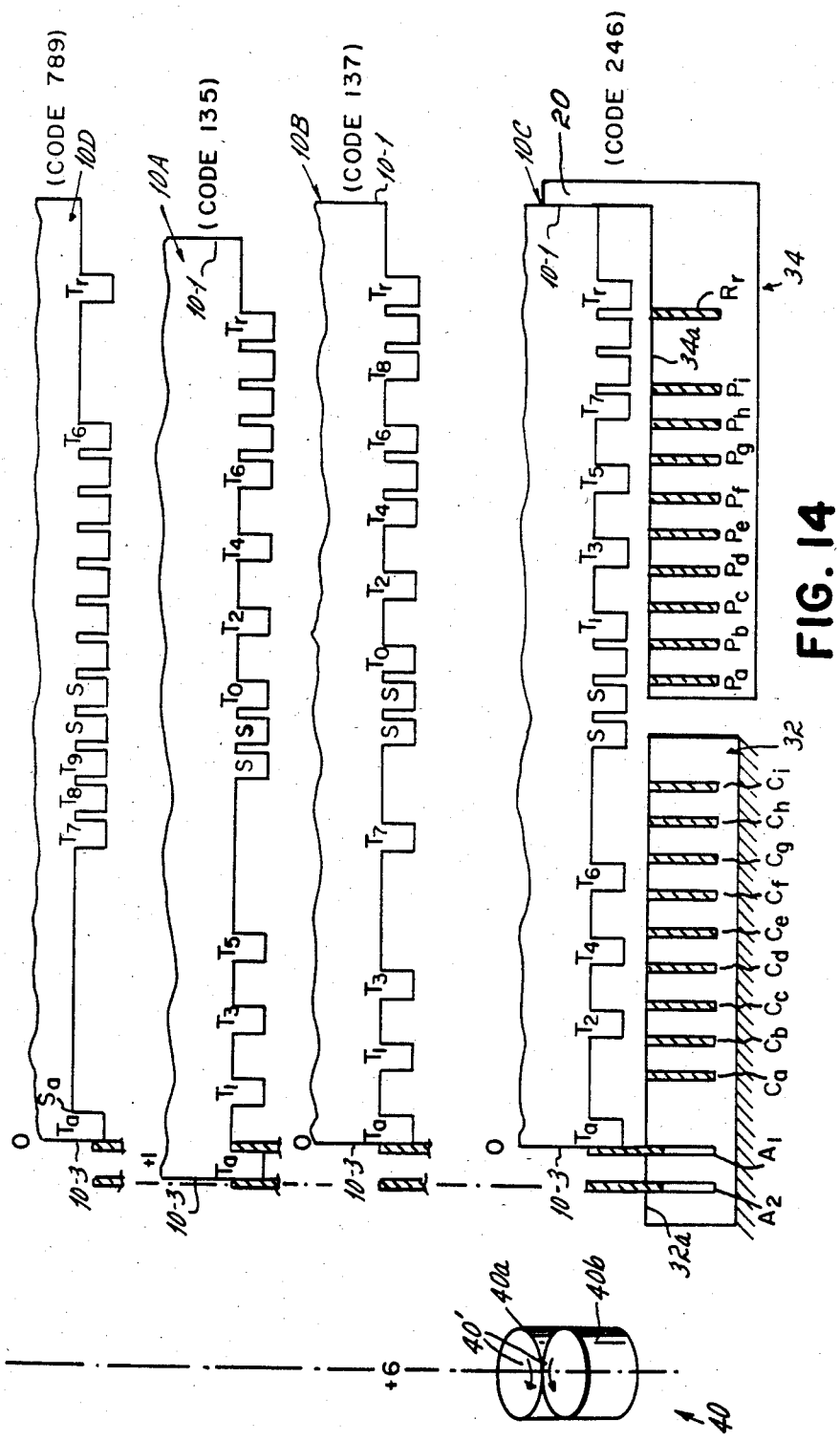

To prepare to recombine the undesired cards 10B, 10C, and 10D into a single group of undesired cards at the 0 position, the elevated sort bars associated with the third digit $D_3$ ("5"), namely, the blades $C_e$ and $P_e$ are lowered, and the acquisition blades $A_1$ and $A_2$ are elevated, as shown in FIG. 13. Recombination of undesired cards 10A, 10B, and 10C is accomplished by shifting rear platen 34 leftwardly from the select position shown in FIG. 13 to the start position shown in FIG. 14. As the platen 34 shifts leftwardly the shoulder 20 thereof which is engaged with the rearward edge 10-1 of undesired card 10D returns card 10D from the −1 position to the 0 position. Undesired cards 10B and 10C which were in the 0 position prior to return of the platen 34 to the start position shown in FIG. 13 remain in the 0 position by reason of engagement of the elevated acquisition blade $A_1$ with the leading edges 10-3 of cards 10B and 10C. The desired card 10A, which is in the +1 position prior to return of the platen 34 to the start position, remains in this position by reason of its acquisition tooth $T_a$ being trapped between elevated acquisition bars $A_1$ and $A_2$. At this point the desired card 10A is the only card in the +1 position, and the remaining undesired cards 10B, 10C, and 10D are in the 0 position, all as shown in FIG. 4.

Figure 15:
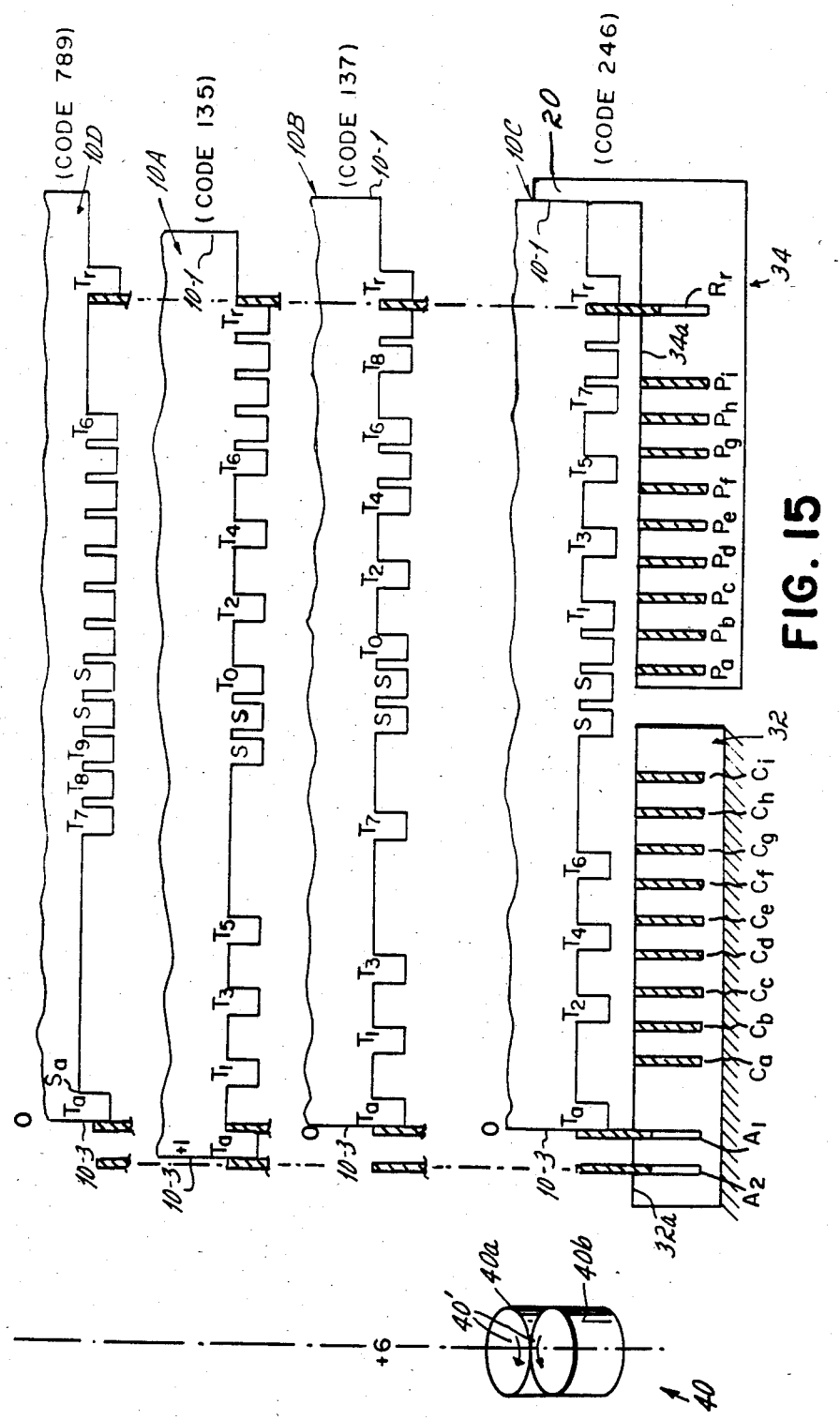

To facilitate advancement of the desired card 10A from the +1 position leftwardly a distance X-T, which in the preferred embodiment equals the width of five teeth, the return blade R is elevated into the slot to the immediate left of the return tooth R of all undesired cards 10B, 10C, and 10D which are in the 0 position, as shown in FIG. 15. When the return bar is in this position it is immediately to the right or rear of the return tooth $T_r$ of the desired card 10A which is in the +1 position, also as shown in FIG. 15. The blades $A_1$ and $A_2$ remain elevated to capture the acquisition tooth $T_a$ of the desired card 10A which is in the +1 position. As noted, the system is in the position shown in FIG. 15.

Figure 16:
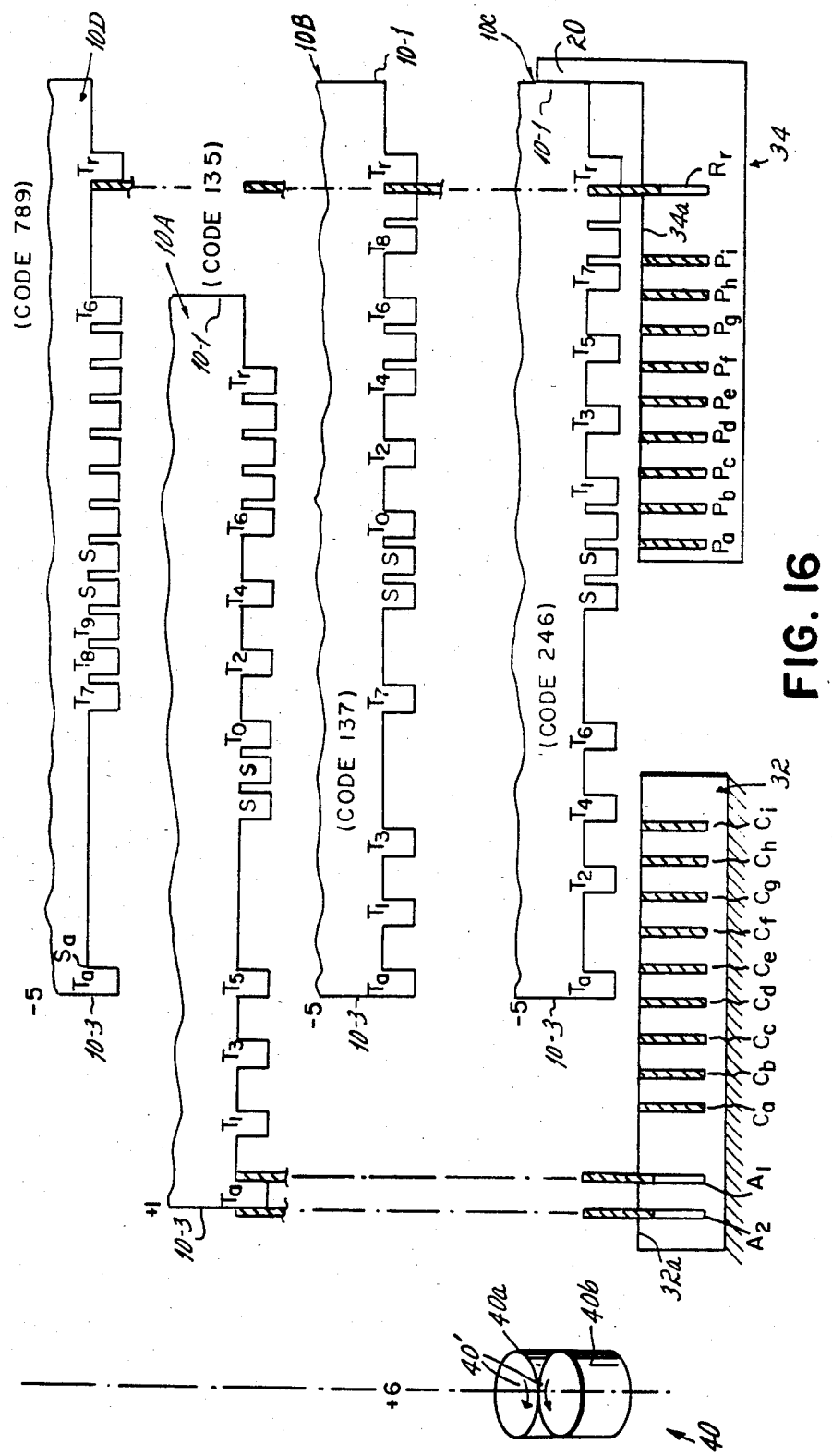

The rear platen 34 is now shifted rightwardly from the start position a distance X-T, which in the preferred embodiment equals five teeth, although this distance is arbitrary and could be other distances, to the position shown in FIG. 16. Movement of the platen 34 rightwardly a distance X-T to the position shown in FIG. 16 is effective to move all the undesired cards 10B, 10C, and 10D rightwardly a distance X-T from the 0 position by reason of the engagement of the elevated return bar R with the lefthand edge of the return tooth $T_r$ of each of the undesired cards 10B, 10C, and 10D. With the rear platen having been shifted from the start position a distance X-T (5T), the undesired cards 10B, 10C, and 10D are in a −5 position while the desired card 10A has remained in the +1 position.

Figure 17:
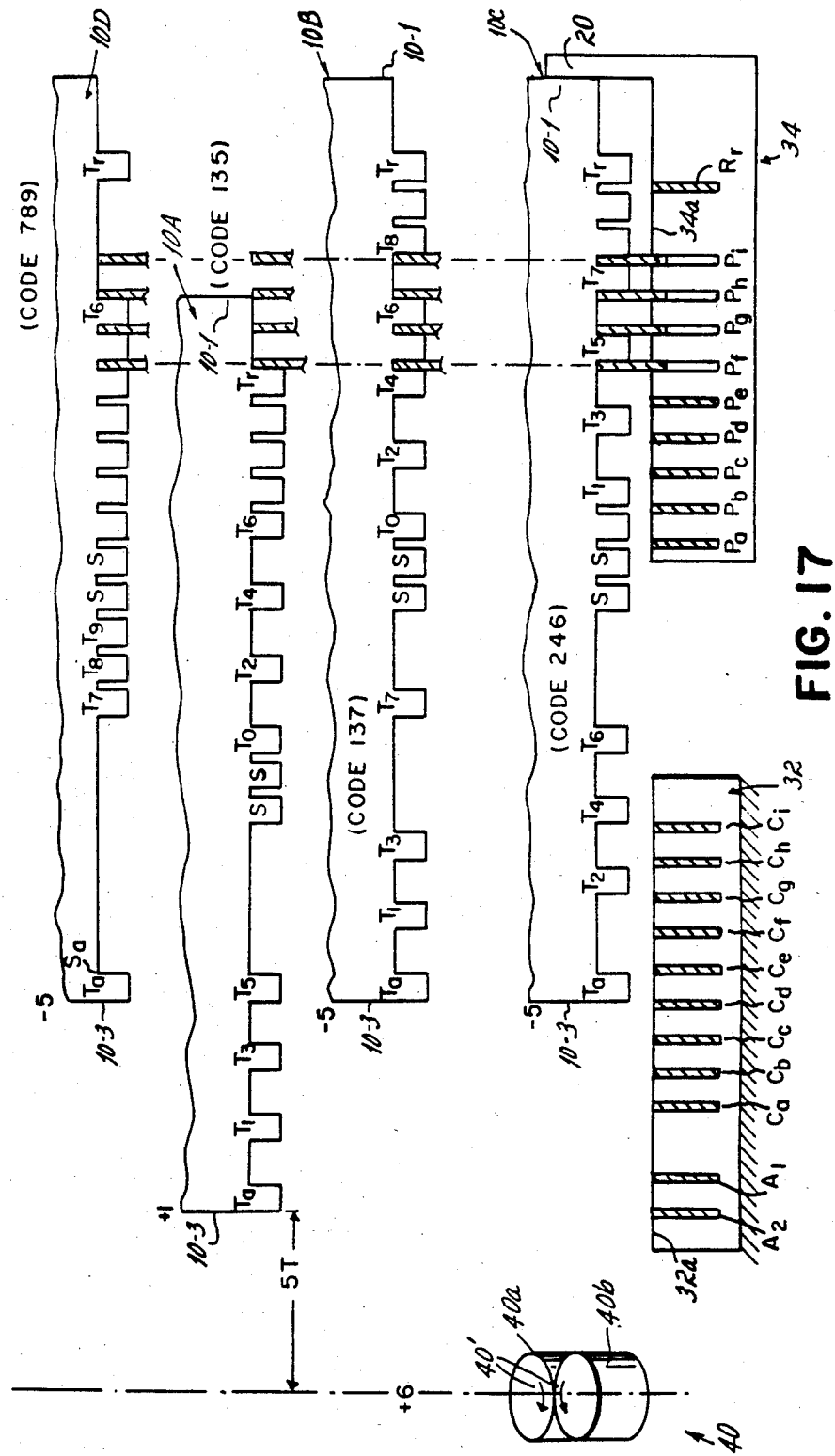
Figure 18:
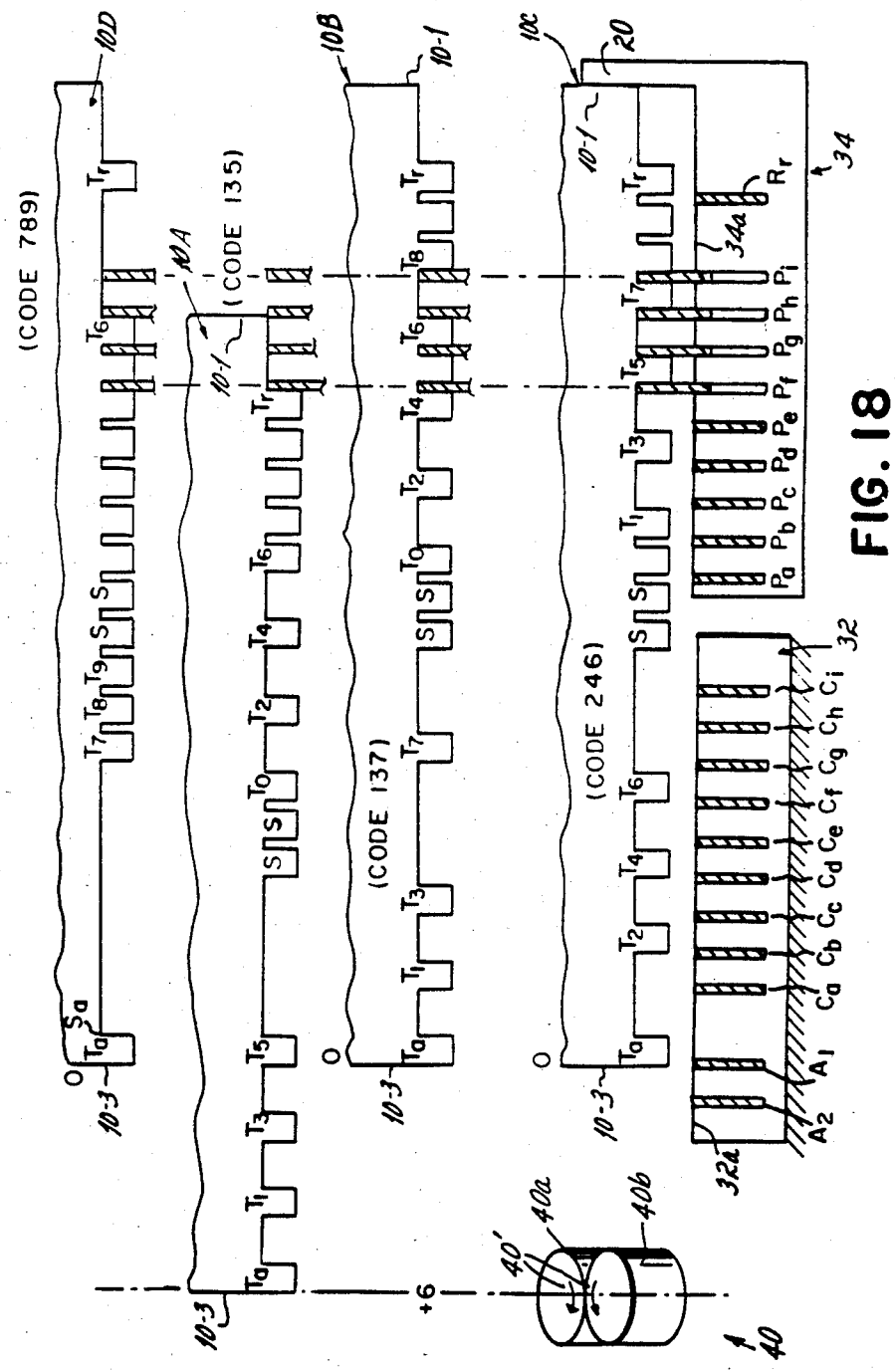

Advancement of the desired card 10A which is now in the +1 position (see FIG. 16) to the nip of the selected card removal device 40 (FIG. 18), requires movement of the desired card 10A leftwardly a distance equal to the width of five teeth (5T). Such movement is accomplished by dropping acquisition bars $A_1$ and $A_2$ which release the acquisition tooth A of the desired card 10A and elevating all primary code teeth $P_f$, $P_g$, $P_h$, and $P_i$ located rearwardly of the return tooth R of the desired card 10A, as shown in FIG. 17. As is apparent, when the rear platen 34 shifts from the position shown in FIG. 17 to the position shown in FIG. 18 leftwardly a distance X-T (5T) to its start position, all the cards, both the desired card 10A and the undesired cards 10B, 10C, and 10D, will be shifted leftwardly a distance X-T (5T) with the result that the desired card 10A which is in the +1 position will be advanced leftwardly into the nip of the selected card removal device 40 and the undesired cards 10B, 10C, and 10D will be advanced leftwardly from the −5 position to the 0 position. With reference to FIG. 18 note that the leading edge 10-3 of the desired card 10A is now in the nip of the selected card removal device 40, the undesired cards 10B, 10C, and 10D are all in the 0 position, and the rear platen 34 is in the start position.

Figure 19:
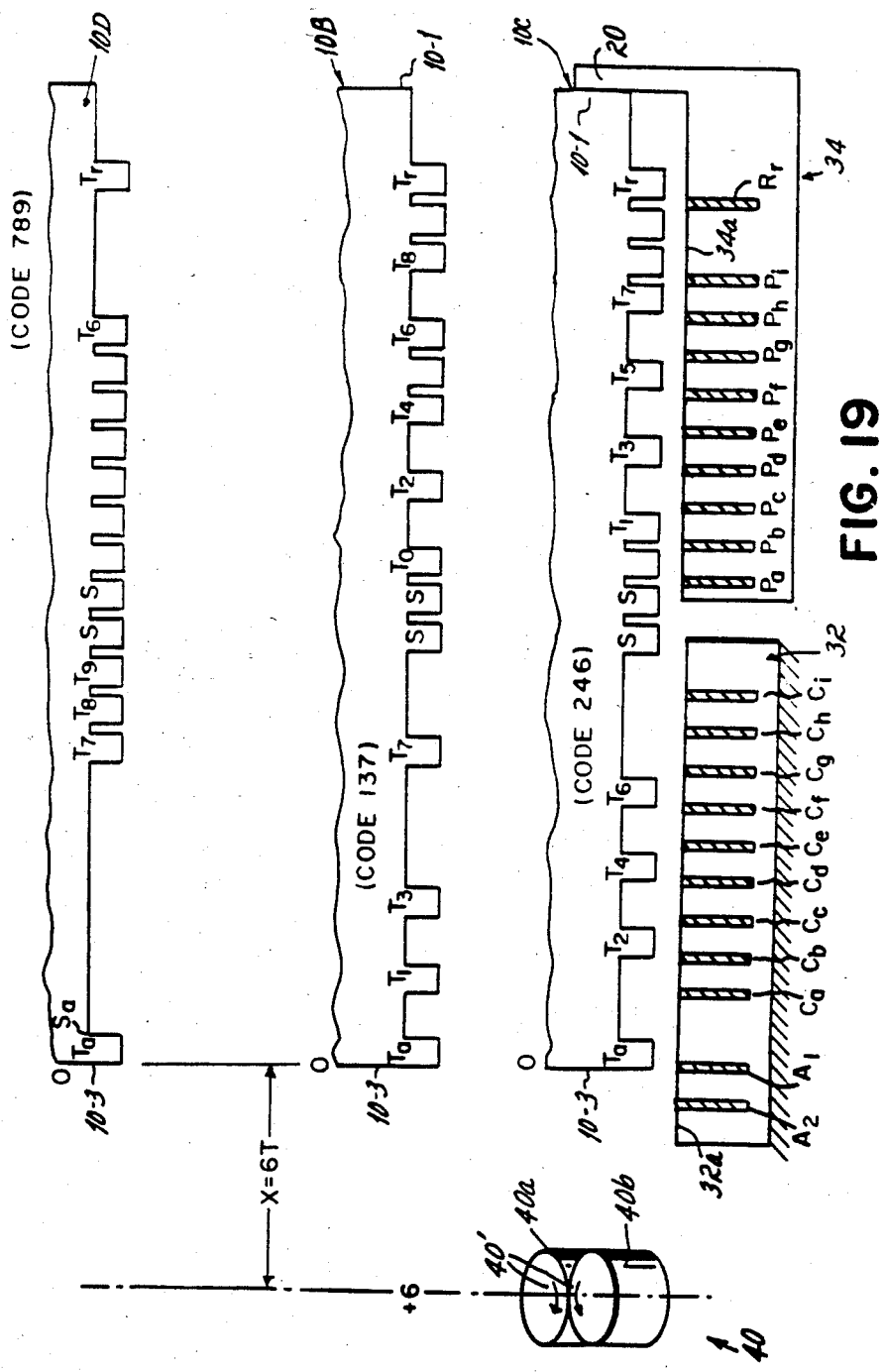

The elevated primary sort blades $P_f$, $P_g$, $P_h$, and $P_i$ are now dropped, restoring the system to the position shown in FIG. 19, which is identical to the initial system position of FIG. 2 except that the desired card 10a has been removed from the deck. Selection of another card is accomplished by repeating the steps shown in the sequence of FIGS. 2–19.

Actuators for elevating and lowering the blades may be of any desired type, and may, for example, be of the type shown in U.S. Pat. No. 3,478,877, assigned to the assignee of this invention, incorporated herein by express reference thereto, which utilizes solenoids to reciprocate the blades longitudinally in the course of which travel inclined cam surfaces thereon ride up or down, depending upon the direction of reciprocation, on a stationary cam member, raising or lowering the blade. Likewise, reciprocation of the movable platen between its various positions can be effected in any desired manner such as utilization of selectively energized solenoids, rotating cam and follower arrangements, etc. For example, a cam/follower similar to that shown in U.S. Pat. No. 3,478,877 for moving the drawer therein can be used to move platen 34.

Energization of the actuators for the selectively elevatable blades and the translating movable platen 34 on a coordinated basis to effect selection of a desired card from the deck and advancement of it to the selected card removal device 40 can be under control of any suitable sequence controller or programming device, mechanical or electrical, including a programmed microprocessor. A suitable circuit, in block diagram format, is shown and described in FIG. 18 and column 13, lines 26–50, of U.S. Pat. No. 4,330,063 in the name of Paul Neumeier, the entire disclosure of FIG. 18 and column 13, lines 26–50 of U.S. Pat. No. 4,330,063 is incorporated herein by reference. Similarly, the selected card removal device 40 may take any desired form, such as a pair of rotatable nip rolls 40a and 40b rotating in the directions shown in FIG. 1, or a vacuum-operated card pickup device which reciprocates along a path parallel to the blades with its vacuum card pickup element appropriately located to contact and remove a selected card when advanced a distance X from position 0.

While there are 10 digit code locations on both the complementary and primary card zones 14 and 12 in the preferred embodiment, there are only nine sorting blades, $P_a, \ldots P_i$ and $C_a, \ldots C_i$, associated with each of the primary and complementary card zones. While there is a sort blade $P_a$ and $C_a$ operatively associated with the code tooth $T_0$ of each of the primary and complementary code zones 12 and 14 prior to the first digit selection step, thereafter this is not the case. Accordingly, if one of the digits of the desired card is a "0", selection of this digit should occur first. Similarly, prior to the first digit selection step, there is not a primary and complementary sort blade associated with code tooth $T_9$ of the primary and complementary card zones 12 and 14, although there is for each digit selection step thereafter. Thus, if the digit "9" is to be selected, it should not be selected first. To avoid the need for selecting the digit "0" as the first selected digit and not selecting the digit "9" in the first digit selection step, additional sort blades (not shown) could be added to the platens 32 and 34 to permit selection of the digits "0" and "9" during any digit selection step. However, such is unnecessary.

Also, it should be noted that, apart from the two restraints on digit selection code sequencing noted above in connection with the digits "0" and "9", which exists by reason of having M-1 complementary and primary sort blades for an "M out of N" encoding format, the digits can be selected in any sequence. That is, a card encoded with the digits 2-4-6 can can be selected by first selecting the digit "2", then "4", and thereafter "6". Alternatively, the digit selection order can be either 4-2-6, 6-4-2, 2-6-4, 4-6-2, or 6-2-4.

What is claimed is:

1. A method of selecting a desired card encoded along a sorting edge thereof from a deck of similarly encoded undesired cards, said desired and undesired cards each including leading and trailing edges between which is located said sorting edge having a complementary code region having selectively removable complementary code teeth, with each complementary tooth having a complementary slot associated therewith rearwardly thereof, a primary code region having selectively removable primary code teeth, with each primary tooth having a primary slot associated therewith forwardly thereof, said card being encodeable in an M out of N digit code format with complementary code teeth remaining, and primary code teeth removed, only at the complementary and primary code locations corresponding to the M digits, an acquisition tooth having a rear edge disposed a predetermined distance rearwardly of the leading edge of said card, and a return tooth having a forward edge disposed a predetermined distance forwardly of said trailing edge, said method comprising:
   (a) combining the desired and undesired cards into a single deck with their sorting edges aligned;
   (b) introducing a complementary and a primary sorting element, which are disposed transversely relative to the sorting edges of the desired and undesired cards, into respective complementary and primary notches of all the cards associated with the first encoded digit of the desired card and moving the primary sorting element rearwardly the width of one tooth to separate the single deck of cards into only (1) a first group, which is maintained stationary by the stationary first digit complementary sort element, containing only cards which each are encoded with the first digit and (2) a second group, which is moved rearwardly by the moving first digit primary sorting element, containing only the remaining cards which each are not encoded with the first digit, the first and second groups being physically separated from each other in a direction parallel to the sorting edges thereof a distance equal to the width of one tooth;

(c) introducing a complementary and a stationary sorting element transversely disposed to the sorting edges of all cards into the respective complementary and primary notches associated with the second encoded digit of the desired card located in the first group and moving the primary sorting element rearwardly the width of one tooth to selectively separate the first and second groups of cards into only (1) a third group, which is maintained stationary by the stationary second digit complementary sort element, containing cards which each are encoded with both the first digit and the second digit, and (2) a fourth group collectively containing the remaining cards which do not each contain both the first and second encoded digits, the fourth group consisting of only two subgroups of cards, formed by said movement of said second digit primary sort element, which are separated relative to each other a distance equal to the width of one tooth in a direction parallel to their respective sorting edges, the third group of cards being separated from each of the two subgroups of the fourth group a distance of at least one tooth width in a direction parallel to the sorting edges thereof;

(d) introducing an acquisition member transversely disposed to the sorting edges of all cards immediately rearwardly of the acquisition tooth of the desired cards in the third group and urging the rearmost subgroup of the fourth group of cards forwardly to combine the two subgroups of the fourth group of cards into a single combined fourth group of cards, the combined fourth group of cards being spaced by the action of said acquisition member from the third group of cards by at least one tooth width in a direction parallel to the sorting edges thereof;

(e) introducing a complementary and a stationary sorting element disposed transversely relative to the sorting edges of the cards into the respective complimentary and stationary notches associated with the third encoded digit of the desired card located in the third group and moving the primary sorting element rearwardly the width of one tooth to separate the third group of cards and the combined fourth group of cards into only (1) a fifth group, which is maintained stationary by the third digit complementary sort element, containing cards each having all three of the encoded first, second, and third digits, and (2) a sixth group containing the remainder of the cards, the sixth group consisting of only two subgroups, formed by the movement of said third digit primary sort element, spaced relative to each other one tooth width apart in a direction parallel to the sorting edges thereof, the two subgroups of the sixth group collectively containing all cards not each having all the first, second, and third encoded digits, the fifth group of cards being spaced from each of the two subgroups of the sixth group by a distance equal to at least one tooth width in a direction parallel to the sorting edges thereof; and (f) introducing the acquisition member transversely disposed to the sorting edges of all cards immediately rearwardly of the acquisition tooth of the desired cards in the fifth group and urging the rearmost subgroup of the sixth group of cards forwardly to combine the two subgroups of the sixth group of cards into a single combined sixth group of cards, the combined sixth group of cards being spaced by the action of the acquisition member from the fifth group of cards by at least One tooth width in a direction parallel to the sorting edges thereof.

2. The method of claim 1 wherein step (c) separates the third group of cards from one of the two subgroups of the fourth group by a distance of one tooth width and from the other of the two subgroups by a distance equal to the width of two teeth; wherein step (d) separates the third group and the combined fourth group by a distance equal to one tooth width; and wherein step (e) separates the fifth group of cards from one of said two subgroups of the sixth group by a distance of one tooth width and from the other of said two subgroups by a distance equal to the width of two teeth.

3. The method of claim 2 comprising the further step of:

introducing acquisition and return members transversely disposed to the sorting edges of all cards in the fifth group immediately rearwardly of the acquisition and return teeth thereof, and substantially separating the acquisition and return members in a direction parallel to the sorting edge to substantially separate the fifth group of cards and the combined sixth group of cards to facilitate convenient removal of the fifth group of cards from the deck of cards.

4. A method of selecting a desired card encoded along a sorting edge thereof from a deck of similarly encoded undesired cards, said desired and undesired cards each including leading and trailing edges between which is located said sorting edge having a complementary code region having selectively removable complementary code teeth, with each complementary tooth having a complementary slot associated therewith rearwardly thereof, a primary code region having selectively removable primary code teeth, with each primary tooth having a primary slot associated therewith forwardly thereof, said card being encodeable in an M out of N digit code format with complementary code teeth remaining, and primary code teeth removed, only at the complementary and primary code locations corresponding to the M digits, an acquisition tooth having a rear edge disposed a predetermined distance rearwardly of the leading edge of said card, and a return tooth having a forward edge disposed a predetermined distance forwardly of said trailing edge, said cards being encoded with N digits $D_1, D_2, \ldots D_N$, comprising:

(a) combining the desired and undesired cards into a single deck with their sorting edges aligned;

(b) introducing a complementary and a primary sorting element, which are disposed transversely relative to the sorting edges of the desired and undesired cards, into respective complementary and primary notches of all the cards associated with the first encoded digit $D_1$ of the desired card and moving the primary sorting element rearwardly the width of one tooth to separate the single deck of cards into only (1) a first group, which is maintained stationary by the stationary first digit complementary sort element, containing only cards which each are encoded with the first digit $D_1$ and (2) a second group, which is moved rearwardly by the moving first digit primary sorting element, containing only the remaining cards which each are not encoded with the first digit $D_1$, the first and second groups being physically separated from each other in a direction parallel to the sorting edges thereof a distance equal to the width of one tooth;

(c) introducing a complementary and a stationary sorting element transversely disposed to the sorting edges of all cards into the respective complementary and primary notches associated with the second encoded digit $D_2$ of the desired card located in the first group and moving the primary sorting element rearwardly the width of one tooth to selectively separate the first and second groups of cards into only (1) a third group, which is maintained stationary by the stationary second digit complementary sort element, containing cards which each are encoded with both the first digit $D_1$ and the second digit $D_2$, and (2) a fourth group collectively containing the remaining cards which do not each contain both the first and second encoded digits, $D_1$ and $D_2$, the fourth group consisting of only two subgroups of cards, formed by said movement of said second digit primary sort element, which are separated relative to each other a distance equal to the width of one tooth in a direction parallel to their respective sorting edges, the third group of cards being separated from each of the two subgroups of the fourth group a distance of at least one tooth width in a direction parallel to the sorting edges thereof;

(d) introducing an acquisition member transversely disposed to the sorting edges of all cards immediately rearwardly of the acquisition tooth of the desired cards in the third group and urging the rearmost subgroup of the fourth group of cards forwardly to combine the two subgroups of the fourth group of cards into a single combined fourth group of cards, the combined fourth group of cards being spaced by the action of said acquisition member from the third group of cards by at least one tooth width in a direction parallel to the sorting edges thereof;

(e) successively repeating steps (c) and (d) with respect to digits $D_3$, $D_4$, ... $D_{(N-1)}$ to successively place into a single group only cards which are each encoded with digits $D_3$, $D_4$, ... $D_{(N-1)}$, respectively, and successively place into a single combined group only cards not each encoded with the digits $D_3$, $D_4$, ... $D_{(N-1)}$, respectively;

(f) repeating step (c) with respect to the last digit $D_N$ to place into a single group only cards which are each encoded with all N digits $D_1$, $D_2$, ... $D_N$, and to place the remaining cards into another group collectively containing only cards which do not each contain all N encoded digits $D_1$, $D_2$, ... $D_N$, the other group consisting of only two subgroups which are separated relative to each other a distance equal to the width of at least one tooth in a direction parallel to their respective sorting edges, the single group of cards being separated from one of the two subgroups of the other group a distance of at least one tooth width in a direction parallel to the sorting edges thereof, and being separated from the other of the two subgroups a distance at least equal to the width of two teeth; and (g) repeating step (d) with respect to said single group of cards encoded with digits $D_1$, $D_2$, ... $D_N$ and the two subgroups of the other group collectively containing only cards which do not each have all N encoded digits $D_1$, $D_2$, ... $D_N$, and combining into a single group the two subgroups of the other group collectively containing all the cards which do not each have the digits $D_1$, $D_2$, ... $D_N$, the combined group being spaced a distance of at least one tooth width in a direction parallel to the sorting edges thereof relative to the group of cards which each contain all the digits $D_1$, $D_2$, ... $D_N$.

5. The method of claim 4 comprising the further step of:

introducing acquisition and return members transversely disposed to the sorting edges of all cards in the group encoded with all digits $D_1$, $D_2$, ... $D_N$ immediately rearwardly of the acquisition and return teeth thereof, and substantially separating the acquisition and return members in a direction parallel to the sorting edge to substantially separate the group of cards which each contain all the digits $D_1$, $D_2$, ... $D_N$ relative to the combined group of cards which do not each contain all the digits $D_1$, $D_2$, ... $D_N$.

6. A card encodeable along an edge thereof which when encoded can be positively held against displacement relative to a deck of similarly encoded cards which are positively displaced relative to the deck, said card comprising:

a blank of sheet stock having leading and trailing edges between which is located a sorting edge, said sorting edge including:

(a) a complementary code region having selectively removable complementary code teeth, with each complementary tooth having a complementary slot associated therewith rearwardly thereof, and (b) a primary code region having selectively removable primary code teeth, with each primary tooth having a primary slot associated therewith forwardly thereof, said card being encodeable in an M out of N digit code format with complementary code teeth remaining, and primary code teeth removed, only at the complementary and primary code locations corresponding to the M digits, and an acquisition tooth on said blank having a rear edge disposed a predetermined distance rearwardly of the leading edge of said card, said rear edge of said acquisition tooth having an associated slot adjacent thereto and being engageable with an acquisition member transversely disposed relative to said deck in said associated slot when said card is displaced relative to said deck a distance equal to the width of at least one code tooth.

7. A card in accordance with claim 6 further including a return tooth on said blank having a forward edge disposed a predetermined distance forwardly of said trailing edge, said return tooth being separated from said trailing edge by a notch, and a return slot disposed forwardly of said return tooth, said forward edge of said return tooth being engageable with a return member transversely disposed relative to said deck in said return slot when said card is displaced relative to said deck a distance equal to the width of one code tooth.

8. The card of claim 7 wherein said return tooth and return slot, and acquisition tooth and associated slot, are located on said sorting edge.

9. A card encodeable along an edge thereof which when encoded can be positively held against displacement from a deck of similarly encoded cards which are positively displaced relative to the deck, said card comprising:
- a blank of sheet stock having leading and trailing edges between which is located a sorting edge, said sorting edge including:
  - (a) a complementary code region having selectively removable complementary code teeth, with each complementary tooth having a complementary slot associated therewith rearwardly thereof, and
  - (b) a primary code region having selectively removable primary code teeth, with each primary tooth having a primary slot associated therewith forwardly thereof,
  said card being encodeable in an M out of N digit code format with complementary code teeth remaining, and primary code teeth removed, only at the complementary and primary code locations corresponding to the M digits, and
- a return tooth on said blank having a forward edge disposed a predetermined distance forwardly of said trailing edge, said return tooth being separated from said trailing edge by a notch, and a return slot disposed forwardly of said return tooth, said forward edge of said return tooth being engageable with a return member transversely disposed relative to said deck when said card is displaced relative to said deck a distance equal to the width of one code tooth.

10. Apparatus for facilitating selection of desired coded edge-notched cards from a deck of similarly encoded undesired cards, said desired and undesired cards each including leading and trailing edges between which is located said sorting edge having a complementary code region having selectively removable complementary code teeth, with each complementary tooth having a complementary slot associated therewith rearwardly thereof, a primary code region having selectively removable primary code teeth, with each primary tooth having a primary slot associated therewith forwardly thereof, said card being encodeable in an M out of N digit code format with complementary code teeth remaining, and primary code teeth removed, only at the complementary and primary code locations corresponding to the M digits, an acquisition tooth having a rear edge disposed a predetermined distance rearwardly of the leading edge of said card, and a return tooth having a forward edge disposed a predetermined distance forwardly of said trailing edge, said apparatus comprising:
- means for supporting the cards with their sorting edges aligned,
- a first set of blades cooperable with said primary teeth and movable toward said sorting edges of said cards and shiftable rearwardly parallel to said sorting edges to shift rearwardly, relative to said deck, undesired cards from either a single initial position undisplaced relative to said deck to a single rear position displaced one tooth width rearwardly relative to said deck from said initial position, or from a single advanced position to said initial position, said advanced and rear positions being displaced relative to said deck a distance equal to the width of two teeth, and
- a second set of blades cooperable with said complementary teeth and movable toward said sorting edges of said cards for holding desired cards against movement when said first set of blades moves said undesired cards relative to said deck.

11. The apparatus of claim 10 further including acquisition means for holding desired cards in said advanced position, and return means shiftable forwardly for returning undesired cards in said rear position, which is displaced relative to said advanced position a distance equal to the width of two teeth, to said initial position displaced relative to said advanced position a distance equal to the width of one tooth.

12. The apparatus of claim 10 for selecting desired coded edge-notched cards from a deck of similarly encoded undesired cards, wherein said card supporting means includes first and second platens disposed to engage said sorting edges of said cards and which also support said first and second sets of blades, respectively.

13. Apparatus for facilitating selection of desired coded edge-notched cards from a deck of similarly encoded undesired cards, comprising:
- means for supporting the cards with their supporting edges aligned,
- a first set of blades movable toward said sorting edges of said cards,
- a second set of blades movable toward said sorting edges of said cards,
- means for successively moving said first set of blades relative to said second set of blades in a rear direction parallel to said sorting edges to successively withdraw rearwardly undesired cards from desired cards which remain stationary to separate desired cards into only a single forwardly disposed group and undesired cards into subgroups which are spaced from each other and from said single forward group of desired cards, with said subgroups of undesired cards being spaced rearwardly of said single group of desired cards, and
- means for combining said subgroups of undesired cards into a single rearward group to prevent the number of subgroups from exceeding two in number notwithstanding said moving means is successively operated at least three times.

14. The apparatus of claim 13 wherein said combining means includes
- an acquisition blade disposed transversely of said cards and engageable with an acquisition tooth of only desired cards in said single forward group, and
- return means engageable with undesired cards in the rearmost of said subgroups and shiftable forwardly, when said acquisition blade is engaged with said acquisition tooth of said desired cards in said forward group, for returning undesired cards in said rearmost subgroup to said forwardmost subgroup to form said single rearward group.

15. The apparatus of claim 14 further comprising:
- a return blade disposed transversely of said cards and engageable with a return tooth of only undesired cards combined in said single rearward group, and
- means for substantially rearwardly shifting said return blade relative to said acquisition blade, when said blades are engaged with their respective acquisition and return teeth of desired and undesired cards, respectively, located in said forward and rearward groups, respectively, for substantially separating said desired and undesired cards.

* * * * *

UNITED STATES PATENT AND TRADEMARK OFFICE
CERTIFICATE OF CORRECTION

PATENT NO. : 4,601,397

DATED : Jul. 22, 1986

INVENTOR(S) : Paul J. Neumeier

It is certified that error appears in the above-identified patent and that said Letters Patent is hereby corrected as shown below:

Column 8, line 33 "34|" should be -- 34'' --.

Column 13, line 67 after "$T_4$." delete -- I --.

Column 5, line 24 , "1" should be -- "-1" --.

Column 14, line 34, "4" should be -- 14 --.

Signed and Sealed this

Third Day of March, 1987

*Attest:*

DONALD J. QUIGG

*Attesting Officer*    *Commissioner of Patents and Trademarks*